US010362574B2

(12) United States Patent
Chendamarai Kannan et al.

(10) Patent No.: US 10,362,574 B2
(45) Date of Patent: Jul. 23, 2019

(54) UPLINK RESOURCE ALLOCATION TECHNIQUES FOR SHARED RADIO FREQUENCY SPECTRUM

(71) Applicant: QUALCOMM Incorporated, San Diego, CA (US)

(72) Inventors: Arumugam Chendamarai Kannan, San Diego, CA (US); Chirag Sureshbhai Patel, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 15/814,764

(22) Filed: Nov. 16, 2017

(65) Prior Publication Data
US 2018/0146480 A1 May 24, 2018

Related U.S. Application Data

(60) Provisional application No. 62/424,382, filed on Nov. 18, 2016.

(51) Int. Cl.
*H04W 4/00* (2018.01)
*H04W 72/04* (2009.01)
(Continued)

(52) U.S. Cl.
CPC ... *H04W 72/0453* (2013.01); *H04W 72/0413* (2013.01); *H04W 72/1268* (2013.01);
(Continued)

(58) Field of Classification Search
None
See application file for complete search history.

(56) References Cited

U.S. PATENT DOCUMENTS

2007/0263702 A1* 11/2007 Kwon .................. H04B 1/713
375/135
2008/0232240 A1* 9/2008 Baum .................. H04L 5/0007
370/210
(Continued)

OTHER PUBLICATIONS

Ericsson: "Multi-Subframe Scheduling Design for Enhanced LAA", 3GPP Draft; R1-165142, 3rd Generation Partnership Project (3GPP), Mobile Competence Centre; 650, Route Des Lucioles; F-06921 Sophia-Anti Polis Cedex; France, vol. RAN WG1, No. Nanjing, China; May 23, 2016-May 27, 2016 May 14, 2016 (May 14, 2016), XP051089837, Retrieved from the Internet: URL:http://www.3gpp.org/ftp/tsg_ran/WG1_RL1/TSGR1_85 1Docs/ [retrieved on May 14, 2016], 5 pages.
(Continued)

*Primary Examiner* — Farah Faroul
(74) *Attorney, Agent, or Firm* — Holland & Hart LLP

(57) ABSTRACT

Disclosed techniques provide for different uplink resource allocation schemes in transmissions that use different shared radio frequency spectrum bands. In some cases, the different shared radio frequency spectrum bands may have different transmission characteristics or parameters, and associated resource allocation schemes may be selected to provide transmissions that are more likely to comply with the transmission characteristics or parameters associated with a particular band. In some cases, resource allocation types may be identified based on one band and mapped to identify uplink resources for an uplink transmission on a different shared radio frequency spectrum band.

30 Claims, 17 Drawing Sheets

(51) Int. Cl.
H04W 72/12 (2009.01)
H04W 72/14 (2009.01)
H04W 16/14 (2009.01)
H04W 74/08 (2009.01)

(52) U.S. Cl.
CPC ............ *H04W 72/14* (2013.01); *H04W 16/14* (2013.01); *H04W 74/0833* (2013.01)

(56) References Cited

U.S. PATENT DOCUMENTS

| | | | | |
|---|---|---|---|---|
| 2009/0168711 A1* | 7/2009 | Fukuoka | ............... | H04L 1/0003 370/329 |
| 2010/0067367 A1* | 3/2010 | Choi | ..................... | H04L 5/0064 370/210 |
| 2010/0099415 A1* | 4/2010 | Li | ........................ | H04W 36/30 455/436 |
| 2014/0177547 A1* | 6/2014 | Guo | .................... | H04W 72/042 370/329 |
| 2014/0286292 A1* | 9/2014 | Park | ...................... | H04L 5/0053 370/329 |
| 2015/0036645 A1 | 2/2015 | Shin et al. | | |
| 2015/0208387 A1* | 7/2015 | Awad | .................. | H04W 72/042 370/329 |
| 2017/0048722 A1* | 2/2017 | Van Phan | ............. | H04W 16/16 |
| 2017/0318565 A1* | 11/2017 | Golitschek Edler von Elbwart | .............. | H04W 72/042 |
| 2018/0063820 A1* | 3/2018 | Xiong | ................ | H04W 72/042 |

OTHER PUBLICATIONS

International Search Report and Written Opinion—PCT/US2017/062361—ISA/EPO—dated Feb. 23, 2018.
LG Electronics: "Remaining Issues on PUSCH Transmission in LAA", 3GPP Draft; R1-166814, 3rd Generation Partnership Project (3GPP), Mobile Competence Centre; 650, Route Des Lucioles; F-06921 Sophia-Anti Polis Cedex; France, vol. RAN WG1, No. Gothenburg, Sweden; Aug. 21, 2016, XP051125571, Retrieved from the Internet: URL:http://www.3gpp.org/ftp/Meetings_3GPP_SYNC/RAN1/Docs/ [retrieved on Aug. 21, 2016], 3 pages.

* cited by examiner

UPLINK RESOURCE ALLOCATION TECHNIQUES FOR SHARED RADIO FREQUENCY SPECTRUM

CROSS REFERENCES

The present Application for Patent claims priority to U.S. Provisional Patent Application No. 62/424,382 by Chendamarai Kannan et al., entitled "Uplink Resource Allocation Techniques For Shared Radio Frequency Spectrum," filed Nov. 18, 2016, assigned to the assignee hereof.

BACKGROUND

Field of the Disclosure

The present disclosure, for example, relates to wireless communication systems, and more particularly to techniques for uplink resource allocation for different bands of shared radio frequency spectrum.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a Long-Term Evolution (LTE) or LTE-Advanced (LTE-A) network, a network access device may take the form of a base station, with a set of one or more base stations defining an eNodeB (eNB). In a next generation, 5G, or new radio (NR) network, a network access device may take the form of a smart radio head (RH) or access node controller (ANC), with a set of smart radio heads in communication with an ANC defining a gNodeB (gNB). In a wireless local area network (WLAN), a network access device may take the form of a WLAN access point. A network access device may communicate with a UE on downlink channels (e.g., for transmissions from the network access device to the UE) and uplink channels (e.g., for transmissions from the UE to the network access device).

Some modes of communication may enable communication between a network access device and a UE over a shared radio frequency spectrum, or over different radio frequency spectrums (e.g., a dedicated radio frequency spectrum and a shared radio frequency spectrum). With increasing data traffic in cellular networks that use a dedicated radio frequency spectrum (e.g., a licensed radio frequency spectrum), offloading of at least some data traffic to a shared radio frequency spectrum may provide a mobile network operator (or cellular operator) with opportunities for enhanced data transmission capacity. Use of a shared radio frequency spectrum may also provide service in areas where access to a dedicated radio frequency spectrum is unavailable.

SUMMARY

Techniques described in the present disclosure provide for different uplink resource allocation schemes in transmissions that use different shared radio frequency spectrum bands. In some cases, the different shared radio frequency spectrum bands may have different transmission characteristics or parameters, and associated resource allocation schemes may be selected to provide transmissions that are more likely to comply with the transmission characteristics or parameters associated with a particular band. In some cases, resource allocation types may be identified based on one band and mapped to identify uplink resources for an uplink transmission on a different shared radio frequency spectrum band.

In an example, a base station may select a frequency band of two or more available shared radio frequency spectrum bands to be used by a UE for an uplink transmission to the base station. In some instances, the two or more available shared radio frequency spectrum bands may specify different transmission parameters, such as having different energy emission limits. For example, a 3.5 GHz shared radio frequency spectrum may have a lower energy emission limit than a 5.0 GHz shared radio frequency spectrum. The base station may identify a resource allocation scheme for the uplink transmission based at least in part on the selected frequency band, and configure the UE to transmit the uplink transmission using the identified resource allocation scheme.

In some cases, configuring a UE to transmit an uplink transmission using a particular resource allocation scheme may involve configuring the UE to transmit a waveform interlaced with either uniformly or non-uniformly spaced resource blocks (RBs). Selecting between interlacing with uniformly or non-uniformly spaced RBs may be used to generate a waveform that meets transmission parameters of a particular shared radio frequency spectrum band (e.g., emission energy limits of the 3.5 GHz).

Uniform and non-uniform spacing may refer to a distribution of RBs across the frequency domain. Uniformly spaced RBs may be spaced apart at periodic intervals in the frequency domain (e.g., every tenth RB across the frequency domain), and non-uniformly spaced resource blocks may be spaced apart at non-periodic intervals in the frequency domain (e.g., one or more RBs may be contiguous in the frequency domain). A uniformly interlaced waveform may provide benefits for transmissions using the 5.0 GHz shared radio frequency spectrum band, but such a waveform may exceed tighter regulatory emissions limits if transmitted in the 3.5 GHz band. A non-uniformly interlaced waveform may provide reduced emission energies as compared to a uniformly interlaced waveform, and allow transmission at a higher power relative to a transmission power of a uniformly interlaced waveform.

In some examples, the base station may configure the UE by transmitting to the UE an uplink grant indicating a resource allocation type and a frequency band to use for the uplink transmission. The UE may identify a resource allocation scheme of a set of available resource allocation schemes for the uplink transmission based on the indicated resource allocation type and the indicated frequency band. For example, the UE may identify to transmit an uplink transmission that is a waveform interlaced with uniform or non-uniform RBs, depending on which frequency band is indicated in the uplink grant.

In some cases, the resource allocation type may correspond to a first frequency band (e.g., a 5.0 GHz shared radio frequency spectrum band) that differs from a second frequency band indicated in the uplink grant (e.g., 3.5 GHz shared radio frequency spectrum band). The base station may configure the UE to apply a mapping function to map resources indicated in the resource allocation type of the first frequency band to resources in the second frequency band that are used to transmit an uplink transmission. The UE may transmit an uplink transmission to the base station using resources determined from the mapping. For example, the UE may map a set of uniformly spaced RBs to a contiguous set of RBs, for generating the uplink transmission as a waveform interlaced with non-uniformly spaced RBs to meet the transmission parameters of the 3.5 GHz band. Beneficially, the techniques described herein may be used for sending transmissions within a frequency band that satisfies transmission parameters (e.g., emission energy limits) of that frequency band, and for mapping of resources from one frequency band to another.

A method of wireless communication is described. The method may include selecting a frequency band of two or more available shared radio frequency spectrum bands for an uplink transmission from a UE to a base station, identifying a resource allocation scheme of a plurality of available resource allocation schemes for the uplink transmission based at least in part on the selected frequency band, and transmitting the uplink transmission from the UE to the base station using the identified resource allocation scheme.

An apparatus for wireless communication is described. The apparatus may include means for selecting a frequency band of two or more available shared radio frequency spectrum bands for an uplink transmission from a UE to a base station, means for identifying a resource allocation scheme of a plurality of available resource allocation schemes for the uplink transmission based at least in part on the selected frequency band, and means for transmitting the uplink transmission from the UE to the base station using the identified resource allocation scheme.

Another apparatus for wireless communication is described. The apparatus may include a processor, memory in electronic communication with the processor, and instructions stored in the memory. The instructions may be executable by the processor to cause the apparatus to select a frequency band of two or more available shared radio frequency spectrum bands for an uplink transmission from a UE to a base station, identify a resource allocation scheme of a plurality of available resource allocation schemes for the uplink transmission based at least in part on the selected frequency band, and transmit the uplink transmission from the UE to the base station using the identified resource allocation scheme.

A non-transitory computer readable medium for wireless communication is described. The non-transitory computer-readable medium may include instructions executable by a processor to select a frequency band of two or more available shared radio frequency spectrum bands for an uplink transmission from a UE to a base station, identify a resource allocation scheme of a plurality of available resource allocation schemes for the uplink transmission based at least in part on the selected frequency band, and transmit the uplink transmission from the UE to the base station using the identified resource allocation scheme.

In some examples of the method, apparatus, and non-transitory computer-readable medium, identifying the resource allocation scheme includes receiving an uplink grant from the base station, determining whether the uplink grant includes a resource allocation (RA) type for a first frequency band of the two or more available shared radio frequency spectrum bands or a second frequency band of the two or more available shared radio frequency spectrum bands, and identifying the resource allocation scheme for the uplink transmission based at least in part on the RA type.

In some examples of the method, apparatus, and non-transitory computer-readable medium, identifying the resource allocation scheme further includes identifying first uplink resources based on a first frequency band of the two or more available shared radio frequency spectrum bands in the uplink grant, identifying that a second frequency band of the two or more available shared radio frequency spectrum bands may be to be used for the uplink transmission, and determining second uplink resources for the second frequency band based on a mapping from the first uplink resources.

In some examples of the method, apparatus, and non-transitory computer-readable medium, the first uplink resources identify a first interlace of resource blocks (RBs), and the mapping from the first uplink resources identifies a RB index of a starting RB for a set of RBs for the uplink transmission contiguous in the frequency domain based at least in part on the first interlace of RBs.

In some examples of the method, apparatus, and non-transitory computer-readable medium, the first uplink resources identify a set of interlaces of RBs uniformly distributed in the frequency domain, and the mapping from the first uplink resources identifies interlaces of RBs non-uniformly distributed in the frequency domain for the uplink transmission.

In some examples of the method, apparatus, and non-transitory computer-readable medium, the first uplink resources identify first interlace of RBs, and the mapping from the first uplink resources identifies at least two clusters of RBs contiguous in the frequency domain for the uplink transmission based at least in part on the first interlace of RBs.

In some examples of the method, apparatus, and non-transitory computer-readable medium, the second uplink resources may be selected to provide out-of-band emissions having an energy that may be below an energy limit associated with the second frequency band.

In some examples of the method, apparatus, and non-transitory computer-readable medium, identifying the resource allocation scheme includes receiving an uplink grant from the base station, determining whether the uplink grant includes a first RA type for a first frequency band of the two or more available shared radio frequency spectrum bands or a second RA type associated with a dedicated radio frequency spectrum band, and identifying the resource allocation scheme for the uplink transmission based at least in part on the RA type.

In some examples of the method, apparatus, and non-transitory computer-readable medium, determining whether the uplink grant includes the first RA type or the second RA type includes identifying that a second frequency band of the two or more available shared radio frequency spectrum bands may be to be used for the uplink transmission, and determining second uplink resources for the second frequency band based on a mapping from first uplink resources indicated in the uplink grant.

In some examples of the method, apparatus, and non-transitory computer-readable medium, the first uplink resources identify a first interlace of RBs, and the mapping from the first uplink resources identifies a RB index of a starting RB for a set of RBs contiguous in the frequency domain for the uplink transmission based at least in part on the first interlace of RBs.

In some examples of the method, apparatus, and non-transitory computer-readable medium, the mapping from the first uplink resources further identifies an interlace offset for the starting RB.

In some examples of the method, apparatus, and non-transitory computer-readable medium, the mapping from the first uplink resources further identifies a shift to be applied to the starting RB.

In some examples of the method, apparatus, and non-transitory computer-readable medium, the one or more of the interlace offset or the shift may be indicated in the uplink grant, may be semi-statically configured at the UE via a system information block (SIB) or dedicated UE signaling, or may be fixed according to a specified offset or look-up table.

In some examples of the method, apparatus, and non-transitory computer-readable medium, the first uplink resources identify a first interlace of RBs and a second interlace of RBs, and the mapping from the first uplink resources identifies a RB index of a starting RB for a set of RBs contiguous in the frequency domain for the uplink transmission based at least in part on both the first interlace of RBs and the second interlace of RBs.

In some examples of the method, apparatus, and non-transitory computer-readable medium, the first uplink resources identify a first interlace of RBs and a second interlace of RBs, and the mapping from the first uplink resources includes: identifying a first RB index of a first starting RB for a first subset of RBs contiguous in the frequency domain for the uplink transmission based at least in part on both the first interlace of RBs and the second interlace of RBs. Some examples of the method, apparatus, and non-transitory computer-readable medium may further include operations, features, means, or instructions for identifying a second RB index of a second starting RB for a second subset of RBs contiguous in the frequency domain for the uplink transmission based at least in part on both the first interlace of RBs and the second interlace of RBs.

In some examples of the method, apparatus, and non-transitory computer-readable medium, identifying the resource allocation scheme includes receiving a trigger to transmit the uplink transmission, determining whether to transmit the uplink transmission using a first frequency band of the two or more available shared radio frequency spectrum bands or a second frequency band of the two or more available shared radio frequency spectrum bands, and identifying the resource allocation scheme for the uplink transmission based at least in part on the first frequency band or the second frequency band to be used for the uplink transmission.

In some examples of the method, apparatus, and non-transitory computer-readable medium, the trigger includes an indication to transmit one or more of an uplink control channel transmission, a sounding reference signal transmission, or a random access transmission.

In some examples of the method, apparatus, and non-transitory computer-readable medium, the resource allocation scheme may be pre-configured at the UE via a broadcast message provided by the base station or a specified resource allocation scheme.

In some examples of the method, apparatus, and non-transitory computer-readable medium, identifying the resource allocation scheme includes autonomously initiating the uplink transmission, determining whether to transmit the uplink transmission using a first frequency band of the two or more available shared radio frequency spectrum bands or a second frequency band of the two or more available shared radio frequency spectrum bands, and identifying the resource allocation scheme for the uplink transmission based at least in part on the first frequency band or the second frequency band to be used for the uplink transmission.

Some examples of the method, apparatus, and non-transitory computer-readable medium may further include operations, features, means, or instructions for transmitting an uplink control channel with the uplink transmission that indicates the resource allocation scheme.

In some examples of the method, apparatus, and non-transitory computer-readable medium, the two or more available shared radio frequency spectrum bands may have different energy emission limits A method of wireless communication is described. The method may include selecting, at a base station, a frequency band of two or more available shared radio frequency spectrum bands to be used by a UE for an uplink transmission to the base station, identifying a resource allocation scheme for the uplink transmission based at least in part on the selected frequency band, and configuring the UE to transmit the uplink transmission using the identified resource allocation scheme.

An apparatus for wireless communication is described. The apparatus may include means for selecting, at a base station, a frequency band of two or more available shared radio frequency spectrum bands to be used by a UE for an uplink transmission to the base station, means for identifying a resource allocation scheme for the uplink transmission based at least in part on the selected frequency band, and means for configuring the UE to transmit the uplink transmission using the identified resource allocation scheme.

Another apparatus for wireless communication is described. The apparatus may include a processor, memory in electronic communication with the processor, and instructions stored in the memory. The instructions may be executable by the processor to cause the apparatus to select, at a base station, a frequency band of two or more available shared radio frequency spectrum bands to be used by a UE for an uplink transmission to the base station, identify a resource allocation scheme for the uplink transmission based at least in part on the selected frequency band, and configure the UE to transmit the uplink transmission using the identified resource allocation scheme.

A non-transitory computer readable medium for wireless communication is described. The non-transitory computer-readable medium may include instructions executable by a processor to select, at a base station, a frequency band of two or more available shared radio frequency spectrum bands to be used by a UE for an uplink transmission to the base station, identify a resource allocation scheme for the uplink transmission based at least in part on the selected frequency band, and configure the UE to transmit the uplink transmission using the identified resource allocation scheme.

Some examples of the method, apparatus, and non-transitory computer-readable medium may further include operations, features, means, or instructions for allocating uplink resources for the uplink transmission. Some examples of the method, apparatus, and non-transitory computer-readable medium may further include operations, features, means, or instructions for generating an uplink grant that includes a RA type for a first frequency band of the two or more available shared radio frequency spectrum bands or a second frequency band of the two or more available shared radio frequency spectrum bands, wherein the resource allocation scheme for the uplink transmission may be indicated based at least in part on the RA type. Some examples of the method, apparatus, and non-transitory computer-readable medium may further include operations, features, means, or instructions for transmitting the uplink grant to the UE.

Some examples of the method, apparatus, and non-transitory computer-readable medium may further include operations, features, means, or instructions for mapping second uplink resources for a second frequency band of the two or more available shared radio frequency spectrum bands to first uplink resources for a first frequency band of the two or more available shared radio frequency spectrum bands. Some examples of the method, apparatus, and non-transitory computer-readable medium may further include operations, features, means, or instructions for configuring the UE to identify the second uplink resources based on the mapping and an indication that the second frequency band may be to be used for the uplink transmission.

In some examples of the method, apparatus, and non-transitory computer-readable medium, the first uplink resources identify a first interlace of RBs, and the mapping from the first uplink resources identifies a RB index of a starting RB for a set of RBs contiguous in the frequency domain for the uplink transmission based at least in part on the first interlace of RBs.

In some examples of the method, apparatus, and non-transitory computer-readable medium, the first uplink resources identify a set of interlaces of RBs uniformly distributed in the frequency domain, and the mapping from the first uplink resources identifies non-uniform interlaces of RBs for the uplink transmission.

In some examples of the method, apparatus, and non-transitory computer-readable medium, the first uplink resources identify first interlace of RBs, and the mapping from the first uplink resources identifies at least two clusters of RBs contiguous in the frequency domain for the uplink transmission based at least in part on the first interlace of RBs.

In some examples of the method, apparatus, and non-transitory computer-readable medium, the second uplink resources may be selected to provide out-of-band emissions having an energy that may be below a threshold energy level associated with the second frequency band.

In some examples of the method, apparatus, and non-transitory computer-readable medium, identifying the resource allocation scheme comprises allocating uplink resources for the uplink transmission, generating an uplink grant that includes a first RA type for a first frequency band of the two or more available shared radio frequency spectrum bands or a second RA type associated with a dedicated radio frequency spectrum band, wherein the resource allocation scheme for the uplink transmission may be indicated based at least in part on the RA type, and transmitting the uplink grant to the UE.

Some examples of the method, apparatus, and non-transitory computer-readable medium may further include operations, features, means, or instructions for configuring the UE to determine whether the uplink grant includes the first RA type or the second RA type based at least in part on whether a first frequency band or a second frequency band of the two or more available shared radio frequency spectrum bands may be to be used for the uplink transmission and to determine uplink resources for the uplink transmission based on the RA type. Some examples of the method, apparatus, and non-transitory computer-readable medium may further include operations, features, means, or instructions for mapping second uplink resources for the second frequency band to first uplink resources indicated in the uplink grant.

In some examples of the method, apparatus, and non-transitory computer-readable medium, the first uplink resources identify a first interlace of RBs, and the mapping from the first uplink resources identifies, based at least in part on a first interlace or RBs, one or more of a RB index of a starting RB for a set of RBs contiguous in the frequency domain for the uplink transmission, an interlace offset for the starting RB, or a shift to be applied to the starting RB.

In some examples of the method, apparatus, and non-transitory computer-readable medium, one or more of the interlace offset or the shift may be indicated in the uplink grant or may be semi-statically configured at the UE.

Some examples of the method, apparatus, and non-transitory computer-readable medium may further include operations, features, means, or instructions for configuring the UE to transmit one or more of an uplink control channel transmission, a sounding reference signal (SRS), or a random access transmission using a first frequency band of the two or more available shared radio frequency spectrum bands or a second frequency band of the two or more available shared radio frequency spectrum bands. Some examples of the method, apparatus, and non-transitory computer-readable medium may further include operations, features, means, or instructions for configuring the UE to identify the resource allocation scheme for the uplink transmission based at least in part on the first frequency band or the second frequency band to be used for the uplink transmission.

In some examples of the method, apparatus, and non-transitory computer-readable medium, the two or more available shared radio frequency spectrum bands may have different energy emission limits.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
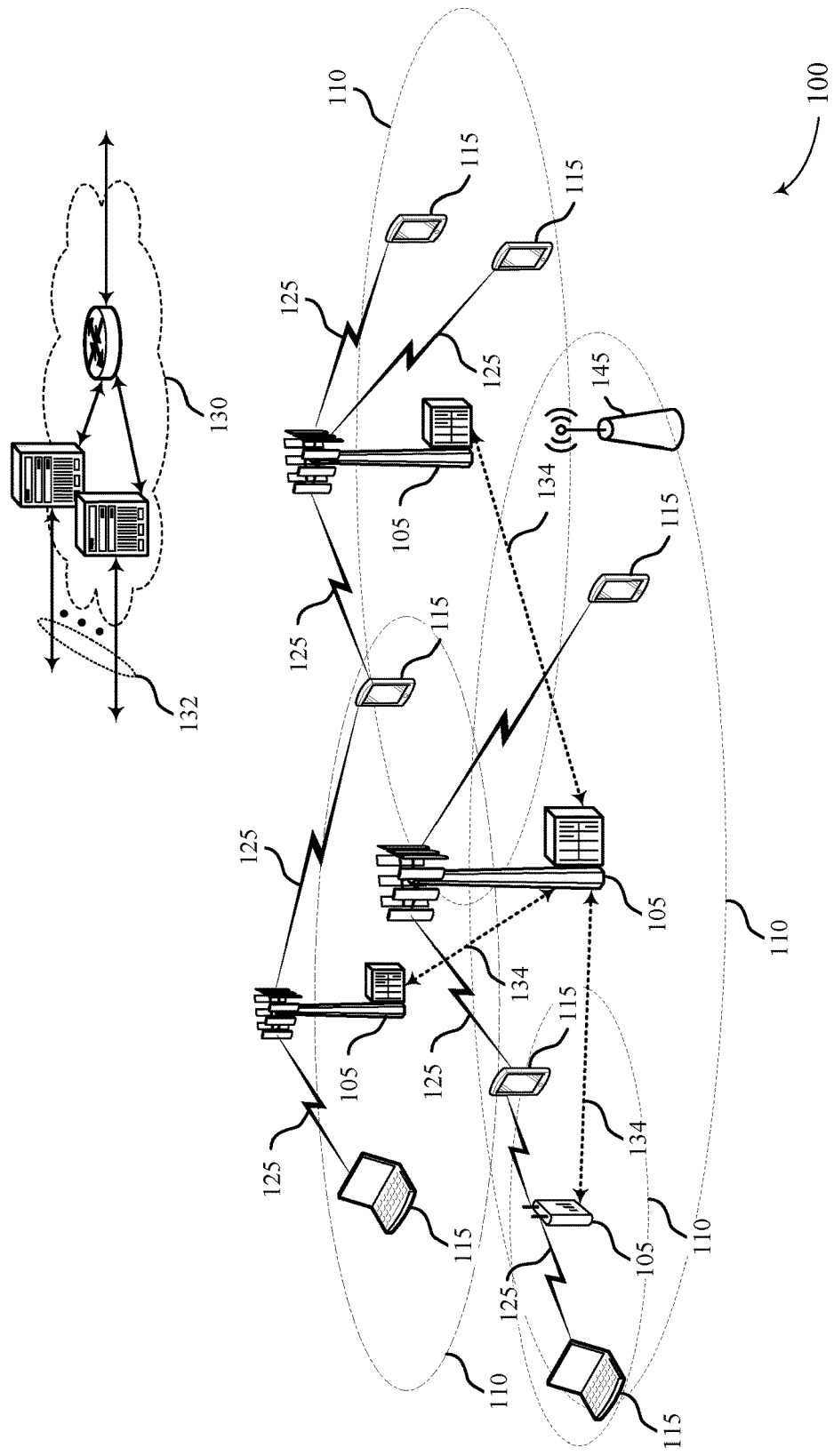
FIG. 1 illustrates an example of a wireless communication system, in accordance with various aspects of the present disclosure.

Techniques are described in which a shared radio frequency spectrum is used for at least a portion of communications in a wireless communication system. In some cases, different shared radio frequency spectrum bands may have different transmission characteristics or parameters, and associated resource allocation schemes may be selected to provide transmissions that are more likely to comply with the transmission characteristics or parameters associated with a particular band. For example, a resource allocation may include a set of resource blocks that are contiguous in the frequency domain or a set of resource blocks that are non-contiguous in the frequency domain. Different distributions of resource blocks in the frequency domain may be associated with different bandwidth occupancy or emission characteristics. Because different radio frequency spectrum bands may be associated with different occupancy criteria (e.g., a criteria that transmissions span at least a minimum bandwidth) or emission criteria (e.g., limits on out-of-band emissions associated with transmissions), resource allocations with different distributions of resource blocks in the frequency domain may be selected for the different radio frequency spectrum bands. In some cases, a resource allocation type may be identified for one band and mapped to identify uplink resources for an uplink transmission on a different shared radio frequency spectrum band, and such mapping may reduce the need for more explicit signaling of a resource allocation in each radio frequency spectrum band.

In some examples, a shared radio frequency spectrum may be used for LTE or LTE-A communications, Licensed Assisted Access (LAA) communications, enhanced LAA (eLAA) communications, or MulteFire communications. The shared radio frequency spectrum may be used in combination with, or independent from, a dedicated radio frequency spectrum. The dedicated radio frequency spectrum may include a radio frequency spectrum licensed to particular users for particular uses. The shared radio frequency spectrum may include a radio frequency spectrum available for Wi-Fi use, a radio frequency spectrum available for use by different radio access technologies, or a radio frequency spectrum available for use by multiple mobile network operators (MNOs) in an equally shared or prioritized manner.

In some examples, a base station may allocate resources for communication with one or more UEs over a first carrier, which may include resources allocated in a first shared radio frequency spectrum band, such as a 5.0 GHz shared radio frequency spectrum. The base station may, additionally or alternatively, allocate resources for communication with UEs over a second carrier, which may include resources allocated in a second shared radio frequency spectrum band, such as a 3.5 GHz shared radio frequency spectrum.

In some deployments that may use shared radio frequency spectrum, an interlaced uplink waveform may be used for uplink transmissions. The interlaced waveform may allow uplink transmissions to meet regulatory constraints on the maximum power spectral density for certain shared radio frequency spectrum (e.g., 5.0 GHz) while still maintaining transmissions at higher power. For example, in some eLAA and MulteFire uplink transmission schemes the uplink waveform may be interlaced with RBs uniformly spaced in the frequency domain within an interlace, and with a single interlace including every tenth RB across the frequency domain, spanning the full system bandwidth. In some examples, the 5.0 GHz band may be used for a first carrier and may include one or more allocated interlaces.

While uplink transmissions using uniform interlaces may provide benefits for transmissions using the 5.0 GHz shared radio frequency spectrum band, such interlaced transmissions may result in emission energy that exceeds tighter regulatory requirements on such emissions if transmitted in the 3.5 GHz shared radio frequency spectrum band. In some cases, uplink resource allocations for transmissions using the 3.5 GHz band may provide allocations of RBs that are contiguous, or where subsets of allocated RBs are located in contiguous RBs. Such contiguous allocations of RBs may provide reduced emission energies and allow the second carrier transmissions to be transmitted at a higher power relative to a transmission power if interlaced RBs were allocated.

In other examples, non-uniform interlaces may be provided for the second carrier, where the non-uniform interlaces provide lower emission energies than uniform interlaces. In some examples, shared radio frequency spectrum bands may have bandwidth occupancy requirements, where a certain percentage of a channel of the shared radio frequency spectrum bands need to be occupied in order to preclude another transmitter from obtaining the channel (e.g., based on a listen-before-talk (LBT) procedure).

Providing interlaced transmissions may help achieve such occupancy requirements, and thus non-uniform interlaces to meet occupancy requirements and emission energy requirements may be beneficial in some circumstances. In cases where a shared radio frequency spectrum band does not have an occupancy requirement, RB allocations that are contiguous in the frequency domain may be beneficial.

Aspects of the disclosure are initially described in the context of a wireless communications system. Various examples of allocation techniques are then described. Aspects of the disclosure are further illustrated by and described with reference to apparatus diagrams, system diagrams, and flowcharts that relate to uplink resource allocation techniques for shared radio frequency spectrum.

FIG. 1 illustrates an example of a wireless communication system 100, in accordance with various aspects of the present disclosure. The wireless communication system 100 may include base stations 105 (i.e., a type of network access device), UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a network access device, a base transceiver station, a radio base station, an access point, a radio transceiver, a NodeB, an eNB, a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro cells or small cells). There may be overlapping geographic coverage areas 110 for different technologies and/or different types of network access devices.

In some examples, the wireless communication system 100 may include an LTE/LTE-A network. In LTE/LTE-A networks, the term eNB may be used to describe sets of one or more base stations 105. In some examples, the wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrums as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

In some examples of the wireless communication system 100, some or all of the base stations 105 may be replaced by one or more other type of network access device. For example, when the wireless communication system 100 includes a 5G or NR network, one or more of the base stations 105 may be replaced by a set of radio heads (e.g., smart radio heads) in communication with an ANC, with the ANC communicating with other ANCs and/or the core network 130. In some examples, the wireless communication system 100 may include multiple types of networks or network access devices. For example, the wireless communication system 100 may include WLAN access points 145.

The wireless communication system 100 may support synchronous or asynchronous operation. For synchronous operation, the base stations 105 may have similar frame timing, and transmissions from different base stations 105 may be approximately aligned in time. For asynchronous operation, the base stations 105, other network access devices, or different networks within the wireless communication system 100 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations or other types of network access devices or network equipment, including macro eNBs, small cell eNBs, relay base stations, and the like.

The communication links 125 shown in wireless communication system 100 may include downlinks (DLs), from a base station 105 to a UE 115, and uplinks (ULs), from a UE 115 to a base station 105. The downlinks may also be called forward links, while the uplinks may also be called reverse links.

In some examples, each communication link 125 may include one or more carriers, where each carrier may be a signal made up of multiple sub-carriers (e.g., waveform signals of different frequencies) modulated according to the various radio technologies described herein. Each modulated signal may be transmitted on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using multiple CCs when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

In some examples, the wireless communication system 100 may support operation over a dedicated radio frequency spectrum (e.g., a radio frequency spectrum licensed to particular users for particular uses) or a shared radio frequency spectrum (e.g., a radio frequency spectrum that is available for Wi-Fi use, a radio frequency spectrum that is available for use by different radio access technologies, or a radio frequency spectrum that is available for use by multiple MNOs in an equally shared or prioritized manner).

In some examples, a transmitting apparatus such as one of the base stations 105 or UEs 115 may use a gating interval to gain access to a wireless channel of a shared radio frequency spectrum (e.g., to a physical channel of the shared radio frequency spectrum). In some examples, the gating interval may be synchronous and periodic. For example, the periodic gating interval may be synchronized with at least one boundary of an LTE/LTE-A radio interval. In other examples, the gating interval may be asynchronous. The gating interval may define the application of a sharing protocol, such as an LBT protocol based on the LBT protocol specified in European Telecommunications Standards Institute (ETSI) (EN 301 893).

When using a gating interval that defines the application of an LBT protocol, the gating interval may indicate when a transmitting apparatus needs to perform a contention procedure (e.g., an LBT procedure) such as a clear channel assessment (CCA) procedure or an extended CCA (ECCA) procedure. The outcome of the CCA procedure or ECCA procedure may indicate to the transmitting apparatus whether a wireless channel of a shared radio frequency spectrum is available or not available for the gating interval (e.g., an LBT radio frame or transmission burst).

When a CCA procedure or ECCA procedure indicates the wireless channel is available for a corresponding LBT radio frame or transmission burst (e.g., "clear" for use), the transmitting apparatus may reserve or use the wireless channel of the shared radio frequency spectrum during part or all of the LBT radio frame or other transmission interval. When a CCA procedure or ECCA procedure indicates the wireless channel is not available (e.g., that the wireless channel is in use or reserved by another transmitting apparatus), the transmitting apparatus may be prevented from using the wireless channel during the LBT radio frame or other transmission interval. In some examples, a transmitting apparatus may need to perform a CCA procedure or ECCA procedure for some but not other wireless channels in a shared radio frequency spectrum.

In some examples, some or all of the wireless devices (e.g., base stations 105, UEs, WLAN access points 145, etc.) may operate in a 3.5 GHz shared radio frequency spectrum as a Citizens Broadband Service Device (CBSD). A CBSD may be operated within a Citizens Broadband Radio Service (CBRS) framework, which may include locations or devices associated with different shared radio frequency spectrum access priorities or interference restrictions.

To maintain or satisfy such access priorities or interference restrictions, an out-of-band emissions limit may be identified or determined (e.g., estimated). In some examples, the out-of-band emissions limit may be identified at a base station 105 and uplink resource allocation schemes selected to provide that uplink transmissions from a UE 115 are likely to comply with emissions limits associated with the 3.5 GHz shared radio frequency spectrum. In some cases, uplink resource allocation schemes may be identified in relation to uplink resource allocation schemes that have been established for 5.0 GHz shared radio frequency spectrum transmissions.

Figure 2:
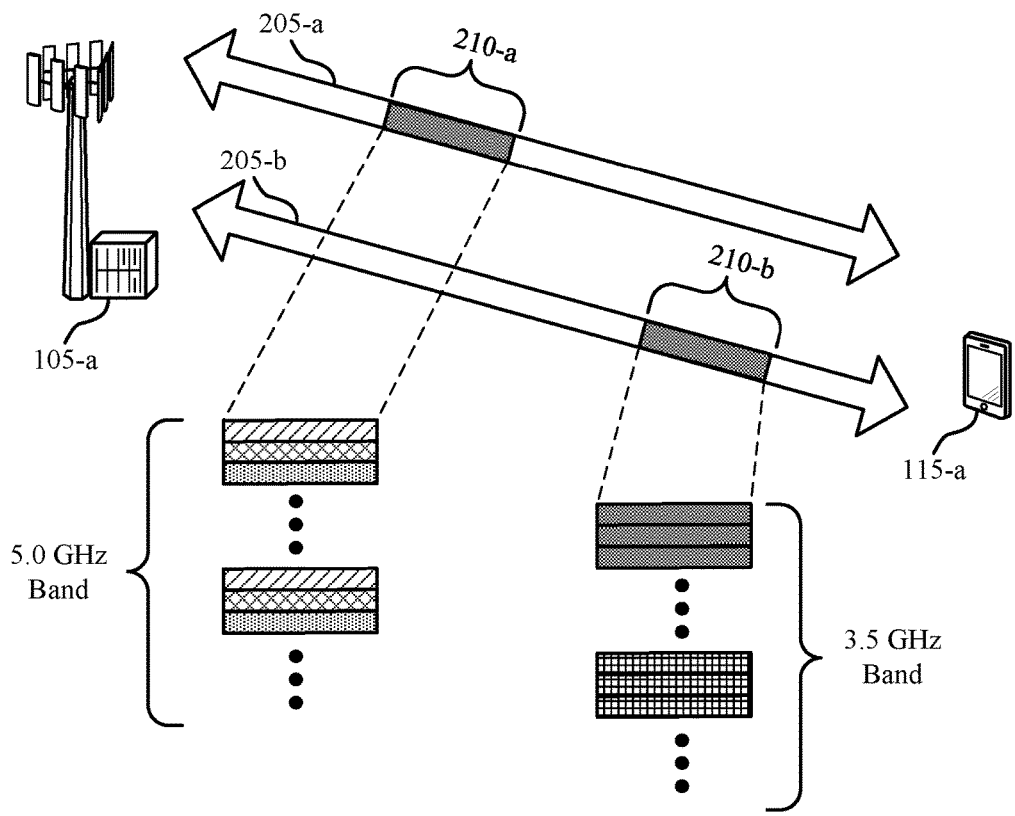
FIG. 2 shows an example of a portion of a wireless communication system, in accordance with various aspects of the present disclosure.

FIG. 2 illustrates an example of a wireless communications system 200 that may employ UL resource allocation schemes, in accordance with various aspects of the disclosure. Wireless communications system 200 includes base station 105-a and UE 115-a, which may be examples of aspects of base stations 105 and UEs 115 as described with reference to FIG. 1. In the example of FIG. 2, the wireless communications system 200 may operate using shared radio frequency spectrum, such as 3.5 GHz shared radio frequency spectrum or 5.0 GHz shared radio frequency spectrum, although techniques described herein may be applied to any radio spectrum and to systems that may concurrently use two or more different radio frequency spectrum bands.

Base station 105-a may communicate with UE 115-a over a first carrier 205-a. In some examples, base station 105-a may allocate resources for communication with UEs over first carrier 205-a, which may include resources allocated in a first shared radio frequency spectrum band, such as a 5.0

GHz shared radio frequency spectrum. Base station 105-*a* may, additionally or alternatively, communicate with UE 115-*a* over a second carrier 205-*b*. In some examples, base station 105-*a* may allocate resources for communication with UEs over second carrier 205-*b*, which may include resources allocated in a second shared radio frequency spectrum band, such as a 3.5 GHz shared radio frequency spectrum. In the example of FIG. 2, the UE 115-*a* may transmit uplink transmissions 210, which may include a first uplink transmission 210-*a* transmitted using first carrier 205-*a* and a second uplink transmission 210-*b* transmitted using second carrier 205-*b*.

In some deployments that may use shared radio frequency spectrum, an interlaced uplink waveform may be used for uplink transmissions. For example, in some eLAA and MulteFire uplink transmission schemes the uplink waveform may be interlaced with uniformly spaced (e.g., in the frequency domain) RBs within an interlace, and with a single interlace including every tenth RB, spanning the full system bandwidth. In the example of FIG. 2, the 5.0 GHz band may be used for first carrier 205-*a*, and first uplink transmission 210-*a* may include interlace-0 215, interlace-1 220, and interlace-2 225.

Uplink resources that may be used for first uplink transmission 210-*a* may be provided by the base station 105-*a* in downlink control information (DCI) that may be provided to the UE 115-*a* and that may include an uplink grant. In LTE systems, an uplink waveform may be constructed at the UE 115-*a* as per the allocation of RBs signaled in the DCI. This resource allocation may be of several types, namely, RA type 0, RA type 1, or RA type 2. RA type 0 supports contiguous (e.g., in the frequency domain) RB allocation only, RA type 1 supports allocation of two sets of RBs, with each having a contiguous set of RBs in the frequency domain, and RA type 2 supports RB allocation that is contiguous in the frequency domain within a narrowband for coverage extension (CE) UEs. Additionally, RA type 3 supports signaling of resource allocations for eLAA and MulteFire transmissions, which may include information related to one or more interlace(s) allocated to the UE 115-*a*, and other information associated with shared radio frequency spectrum transmissions (e.g., LBT information). In some cases, RA type 3 may use six bits to identify interlace allocation indication in 20 MHz bands, and may use four bits for interlace allocation indication in 10 MHz bands.

While uplink transmissions using interlaces such as in first uplink transmission 210-*a* may provide benefits for transmissions using the 5.0 GHz shared radio frequency spectrum band, such interlaced transmissions may result in increased out-of-band emissions if used in the 3.5 GHz shared radio frequency spectrum band. As described, the 3.5 GHz shared radio frequency spectrum band may have tighter regulatory requirements on such out-of-band emissions.

In some cases, uplink resource allocations for transmissions using the 3.5 GHz band may provide allocations of RBs that are contiguous in the frequency domain, or where subsets of allocated RBs are located in RBs that are contiguous in the frequency domain. In the example of FIG. 2, second uplink transmission 210-*b* may include a contiguous RB allocation-0 230 and contiguous RB allocation-1 235 in the 3.5 GHz band. Such allocations of RBs that are contiguous in the frequency domain may provide reduced out-of-band emissions and allow the second uplink transmission 210-*b* to be transmitted at a higher power relative to a transmission power if interlaced RBs (e.g., non-contiguous in the frequency domain) were allocated. While subsets of contiguous RBs are illustrated for second uplink transmission 210-*b*, other examples may include non-contiguous RB allocations, provided their emission properties are satisfactory.

In some examples, to facilitate reduced out-of-band emissions in 3.5 GHz uplink transmissions, a resource allocation type and DCI indication may be provided to indicate that the second uplink transmission 210-*b* is to use uplink resources allocated to provide such properties. In some examples, techniques are provided for uplink resource allocation schemes based on whether the second uplink transmission 210-*b* is a downlink grant-based transmission, a common DCI-based triggered transmission, a random access channel (RACH) transmission (e.g., for initial access or scheduling request (SR)), an SRS transmission, or an autonomous uplink transmission with a corresponding uplink control channel.

Downlink grant-based transmissions may include, for example, physical uplink shared channel (PUSCH) transmissions or MulteFire enhanced physical uplink control channel (MF-ePUCCH) transmissions (which may also be triggered), for example. In some examples, resource allocations for such uplink transmissions may be identified through the use of a new RA type (e.g., RA type 4) for transmissions using the 3.5 GHz band. Such an RA type may provide contiguous and non-contiguous RB allocations that exhibit satisfactory emission properties. For example, allocations of RBs that are contiguous in the frequency domain, as in RA type 0 as discussed herein, may be provided. In other examples, non-uniform interlaces may be provided, such as interlaces with unequal spacing (e.g., non-uniformly distributed in the frequency domain) such that emission criteria of the 3.5 GHz band are satisfied. In further examples, multiple (e.g., two or more) clusters of contiguous RBs with or without equal spacing between them in the frequency domain may be allocated for the uplink transmission.

The indication of the uplink resource allocation may be provided by the base station 105-*a* to the UE 115-*a*, in some examples, using a defined DCI format for single and multiple subframe grants (e.g., similar to established DCI formats 0A/0B/4A/4B) to indicate the new RA type and allocated uplink resources. In other examples, rather than defining a new RA type, a mapping function may be provided from existing DCI 0A/0B/4A/4B to indicate allocations based on the new RA type for 3.5 GHz band operation, which may be known by the UE 115-*a* (e.g., a pre-configured mapping). Such a mapping function may provide a mapping between allocated interlaces associated with a 5.0 GHz band allocation and an associated starting RB location for a 3.5 GHz band allocation. In such examples, existing DCI types may be re-used, and UE 115-*a* may re-interpret the six or four bits that indicate an interlace to identify RB allocations for the 3.5 GHz band. In some cases, the UE 115-*a* may identify that the re-interpretation of the uplink grant is to be performed by identifying that the second uplink transmission 210-*b* is to be transmitted using the 3.5 GHz band.

In other examples, the base station 105-*a* may re-use RA type 1 and/or RA type 2 to indicate uplink resources for the second uplink transmission 210-*b* using the 3.5 GHz band. In some cases, DCI formats may be defined for single and multiple subframe grants similar to DCI types 0A/0B/4A/4B to indicate RA type 1 or RA type 2 is to be used for the 5 GHz transmission. In other examples, rather than define a new DCI, a mapping function from existing DCI 0A/0B/4A/4B to indicate allocations of RA type 1 and/or RA type 2 may be provided. In some cases, the mapping function may only cover a subset of the allocations that are covered by RA type 1 and/or RA type 2.

Figure 3:
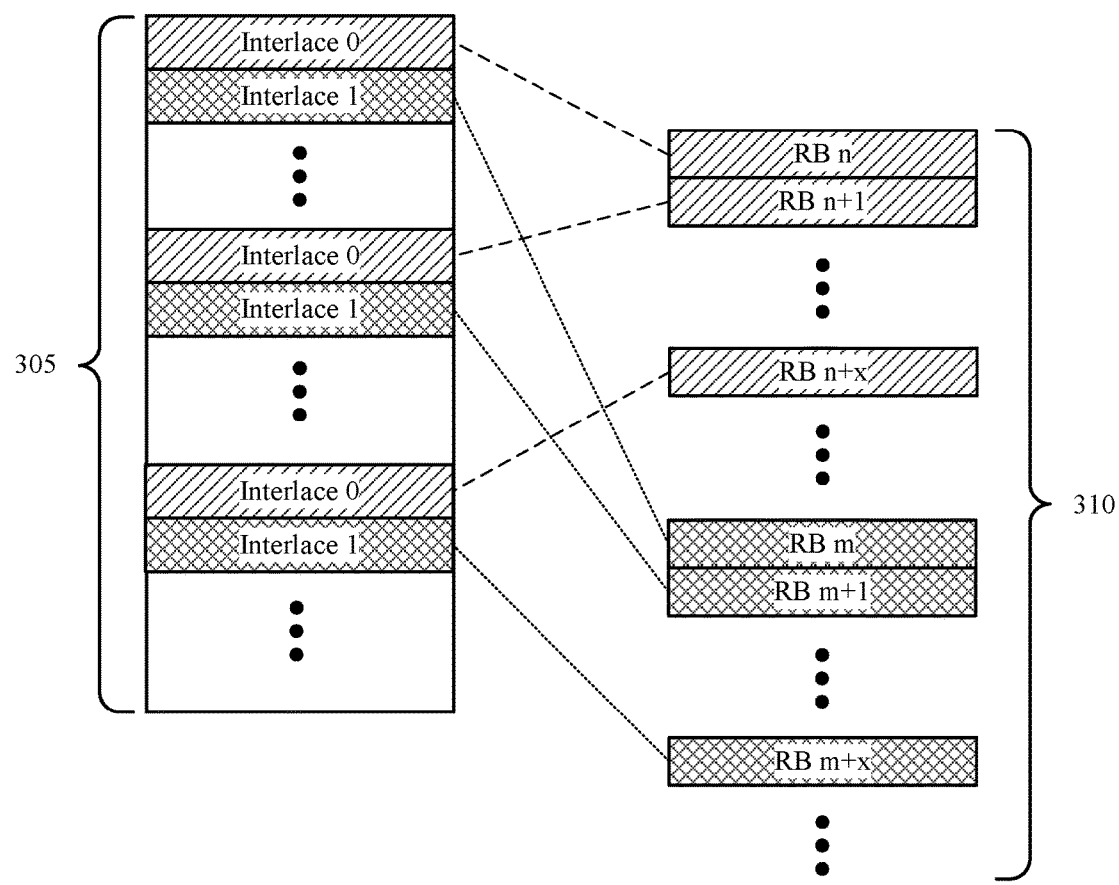
FIG. 3 shows an example of a mapping between resource allocation schemes for different shared radio frequency spectrum bands, in accordance with various aspects of the present disclosure.

FIG. 3 illustrates an example of a mapping 300 from a resource allocation for a 5.0 GHz band to a resource allocation for the 3.5 GHz band. The mapping of FIG. 3 may be used for uplink transmissions between a UE 115 and a base station 105 such as described with respect to FIGS. 1 and 2. The input to the mapping function may be an interlace indication in an uplink grant, and the output may be a contiguous set of RBs (e.g., contiguous in the frequency domain), or set of RBs defined in a look-up table.

In the example of FIG. 3, an uplink allocation 305 may indicate that one or more interlaces are to be used for an uplink transmission. As described herein, in some cases the interlaces may be allocated using four or six bits in an uplink allocation and may indicate interlaces that provide RBs that are uniformly spaced in the frequency domain (e.g. non-contiguous RBs that are located at every tenth RB), spanning the full system bandwidth (e.g., 20 MHz or 10 MHz). In the example of FIG. 3, an indication of interlace 0 may be mapped to a starting location at RB n, with RBs allocated contiguously in the frequency domain through a final RB (RB n+x) of the interlace 0. Likewise, an indication of interlace 1 may be mapped to a starting location at RB m, with RBs allocated contiguously in the frequency domain through a final RB (RB m+x) of the interlace 1. Thus, in this example an interlace index of a 5.0 GHz band uplink allocation may be mapped to a starting RB index of a 3.5 GHz band allocation. In other examples, an offset may be used for an interlace indicated in a 5.0 GHz band allocation.

In one example, the uplink allocation may be provided in a RA type 3 allocation in that indicates interlace {2}, which corresponds to RBs {2, 12, 22, 32, . . . 92} in accordance with RA type 3 allocations. A UE receiving such an allocation, may determine that an uplink transmission is to use the 3.5 GHz band, and may re-interpret this allocation to be for RBs {2, 3, 4, . . . , 11}. While mapping for 5.0 GHz band allocations to 3.5 GHz band allocations are described in various examples, techniques such as described herein are not limited to specific frequency bands, and may be used in other cases as well. The mapping for the uplink allocation may be provided, in some cases, using a SIB message, or may be provided in dedicated UE signaling that may configure the UE to interpret the uplink allocation either as a regular RA type 3 allocation or according to the mapping.

While a simple RB starting index may be used in some examples, other examples may provide an interlace offset, such that the mapped RBs correspond to RBs {2N, 2N+1, . . . 2N+9}, where N is an interlace offset indicated in the DCI, that may be specified or semi-statically configured per UE, that may be broadcast for all UEs in a SIB or other message, or that may be a fixed offset or index to a look-up table that is specified in established communication standards. In still further examples, the mapping may provide mapped RBs that correspond to RBs {2N+M, 2N+M+1, . . . 2N+M+9}, where N and M may be indicated to the UE similarly as discussed above. In still a further example, interlace 0 may simply be mapped to RBs {0, 1, . . . 9}, interlace 1 may be mapped to RBs {10, 11, 12 . . . 19}, and so on, and such a mapping may be indicated to the UE similarly as discussed above.

In other cases, two or more interlaces may be allocated to a UE for uplink transmissions. In such cases, the mapping function for the uplink allocation may simply indicate a starting RB with remaining RBs of the allocation being RBs that are contiguous in the frequency domain from the starting RB. In such cases, the number of interlaces simply influences number of RBs, with the starting RB determined by a first interlace index. In other examples, the two values for the allocate interlaces may be used as in input to a mapping function that identified a starting RB and other RBs based on the allocated interlaces. In some cases, the values for the interlaces may be used as an index to a look-up table that identifies mapped RBs. In still further examples, each interlace may indicate a starting position for mapped contiguous RBs. For example, if the uplink allocation indicates interlace {2, 5} this may be re-interpreted to: RBs {20, 21, . . . 29} and RBs {50, 51, . . . 59} (e.g., an interlace index indicates a starting location times a number of allocated RBs.

As described herein, in some cases a UE may transmit non-grant based uplink transmissions, such as triggered MF-sPUCCH transmissions, MF-ePUCCH transmissions, random access transmissions, SRS transmissions, or combinations thereof. In some examples, the mapping function (as well as the parameters associated therewith) may be variable and semi-statically pre-configured, fixed and pre-defined in a standard, provided in a broadcast message that indicates to the UE whether to reinterpret RA type 3 or not, or combinations thereof. Such mapping may be indicated for multiple UEs or on a on a per-UE basis. For UEs without pre-configured resources, a set of RBs that are contiguous in the frequency domain may be pre-allocated to transmit trigger based transmissions. In some cases, SRS may be transmitted on the same resources as PUSCH or physical uplink control channel (PUCCH) when configured, along with PUSCH, and mapping for SRS-only transmissions may be determined based on, for example, the starting RB and shifts (e.g., N and M as discussed above) that may be semi-statically configured by a base station on a per-UE basis, or configured according to one or more of the techniques described herein.

In cases where the uplink transmission is a random access transmission, in some examples the UE may randomly pick a starting RB and bandwidth within a superset of pre-allocated resources. In other examples, resources made available for random access transmissions may be re-interpreted similarly as described herein. For example, if random access resources are configured for interlace {1}, a UE operating in the second frequency band may use RBs {10, 11, 12, . . . 19}, and; if random access resources are configured in a SIB for interlaces {1, 2}, the UE may use second frequency band may use random access resources in RBs {10, 11, 12 . . . 10} or RBs {20, 21 . . . 29}, for example.

In still further examples, certain UEs may autonomously initiate uplink transmissions. In these cases, the UE may transmit along with it a UE control channel indicating the resources used for transmission. In some examples, resources for the uplink transmissions may be mapped similarly as discussed for grant-based transmissions. In other examples, LTE format 0 or format 4 based definitions for autonomous uplink control channels may be used, or the autonomous uplink control channel may be provisioned to support allocations that are contiguous in the frequency domain.

Figure 4:
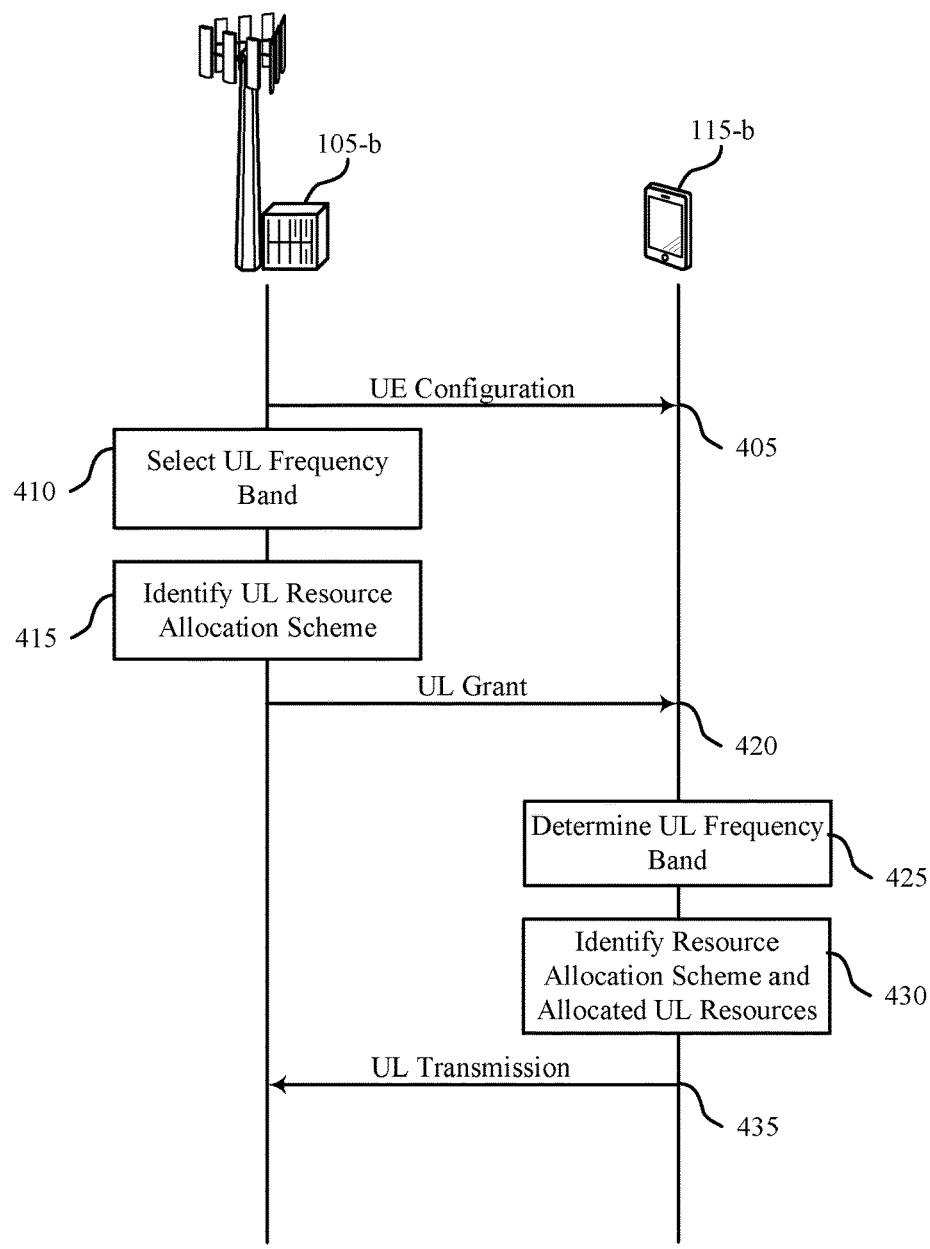
FIG. 4 shows an example of a process flow for uplink resource allocation, in accordance with various aspects of the present disclosure.

FIG. 4 illustrates an example of a process flow 400 for uplink resource allocation in shared radio frequency spectrum, in accordance with various aspects of the disclosure. Process flow 400 may include a base station 105-b, and a UE 115-b, which may be examples of the corresponding devices described with reference to FIG. 1-2.

The base station 105-b may determine a UE configuration, and may transmit the UE configuration 405 to the UE 115-b. In some examples, the configuration may include information related to mapping of allocated uplink resources associated with a first frequency band of a shared radio frequency spectrum to a mapped set of uplink resources associated with a second shared radio frequency spectrum band. As described herein, the configuration may be made using per-UE communications, or may be broadcast to multiple UEs in a SIB. In some cases, a mapping function, look-up table, or combinations thereof may be provided in the configuration or may be pre-specified in an established standard.

At 410, base station 105-b may select an uplink frequency band to be used for an uplink transmission. The selection of the uplink frequency band may include, for example, selecting a first shared radio frequency band (e.g., a 5.0 GHz shared band) or a second shared radio frequency spectrum band (e.g., a 3.5 GHz shared band). The base station 105-b may select the band based on available resources of each band, congestion of each band, channel conditions for each band, other factors, or combinations thereof. In some cases, one of the shared radio frequency spectrum bands may have more stringent out-of-band emission requirements, which may impact uplink resource allocation schemes that may be used to provide efficient communications.

At 415, the base station may identify an uplink resource allocation scheme for the uplink transmission. As described herein, the uplink resource allocation scheme may be selected based on the energy emission limits, bandwidth occupancy requirement, or other factors associated with a particular shared radio frequency spectrum band. In some cases, the uplink resource allocation scheme may be identified and an uplink grant may be generated that may include information that is mapped to provide the uplink allocation scheme, as described herein. The base station 105-b may transmit the uplink grant 420 to the UE 115-b.

At 425, the UE 115-b may determine the uplink frequency band for an uplink transmission based on the received uplink grant 420. In some cases, the uplink grant may include a RA type that is associated with a first shared radio frequency spectrum band and the uplink grant 420 may include an indication that a second shared radio frequency spectrum band is to be used for the uplink transmission.

At 430, the UE 115-b may identify a resource allocation scheme and allocated uplink resources. In some cases, the UE 115-b may make such a determination based on an allocation received in the uplink grant 420 and a frequency band to be used for the uplink transmission. In cases where an RA type of the uplink grant is for a different shared radio frequency spectrum band, the UE 115-b may perform a mapping function to determine the allocated uplink resources. The UE 115-b may then transmit the uplink transmission 435 using the identified uplink resources.

Figure 5:
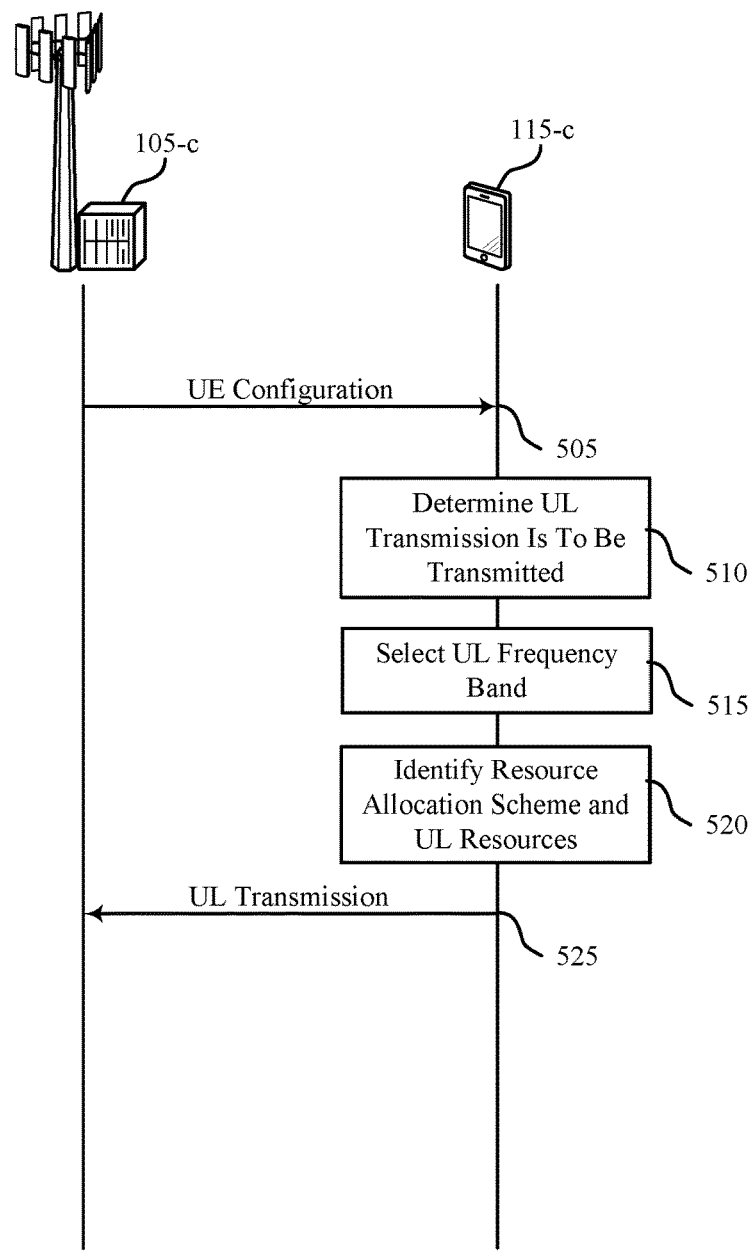
FIG. 5 shows another example of a process flow for uplink resource allocation, in accordance with various aspects of the present disclosure.

FIG. 5 illustrates an example of a process flow 400 for uplink resource allocation in shared radio frequency spectrum, in accordance with various aspects of the disclosure. Process flow 500 may include a base station 105-c, and a UE 115-c, which may be examples of the corresponding devices described with reference to FIG. 1-2.

The base station 105-c may determine a UE configuration, and may transmit the UE configuration 505 to the UE 115-c. In some examples, the configuration may include information related to mapping of allocated uplink resources associated with a first frequency band of a shared radio frequency spectrum to a mapped set of uplink resources associated with a second shared radio frequency spectrum band. In accordance with the present disclosure, the configuration may be made using per-UE communications, or may be broadcast to multiple UEs in a SIB. In some cases, a mapping function, look-up table, or combinations thereof may be provided in the configuration or may be pre-specified in an established standard.

At 510, UE 115-c may determine that an uplink transmission is to be transmitted. Such an uplink transmission may be a non-grant-based uplink transmission, such as a random access transmission, a SRS transmission, a MF-sPUCCH transmission, or a MF-ePUCCH transmission, for example. In some examples, the uplink transmission may be an autonomous uplink shared channel transmission.

At 515, the UE 115-c may select an uplink frequency band to be used for the uplink transmission. The selection of the uplink frequency band may include, for example, selecting a first shared radio frequency band (e.g., a 5.0 GHz shared band) or a second shared radio frequency spectrum band (e.g., a 3.5 GHz shared band). The UE 115-c may select the band based on available resources of each band, congestion of each band, channel conditions for each band, other factors, or combinations thereof. In some cases, one of the shared radio frequency spectrum bands may have more stringent out-of-band emission requirements, which may impact uplink resource allocation schemes that may be used to provide efficient communications.

At 520, the base station may identify an uplink resource allocation scheme for the uplink transmission. In accordance with the present disclosure, the uplink resource allocation scheme may be selected based on the energy emission limits, bandwidth occupancy requirement, or other factors associated with a particular shared radio frequency spectrum band. In some cases, the uplink resource allocation scheme may be identified and uplink transmission resources may be determined based on mapping to resource allocations of one or more other shared radio frequency spectrum bands. In some cases, the UE 115-c may make such a determination based on allocated resources or reserved resources for such uplink transmissions and a frequency band to be used for the uplink transmission. In some cases, the UE 115-c may perform a mapping function to determine the uplink resources. The UE 115-c may then transmit the uplink transmission 525 using the identified uplink resources.

Figure 6:
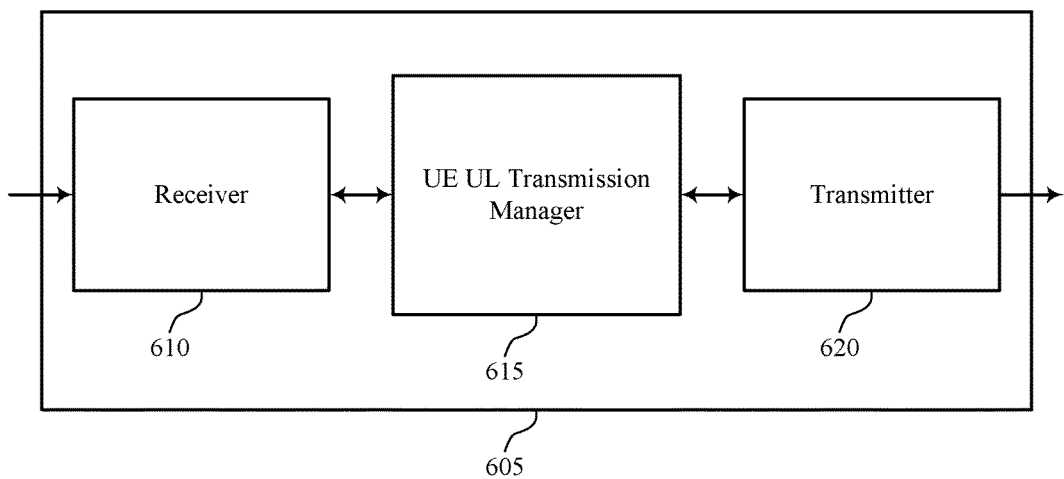
FIGS. 6 and 7 show block diagrams of devices that support uplink resource allocation techniques for shared radio frequency spectrum, in accordance with aspects of the present disclosure.

FIG. 6 shows a block diagram 600 of a wireless device 605 that supports uplink resource allocation techniques for shared radio frequency spectrum, in accordance with various aspects of the present disclosure. Wireless device 605 may be an example of aspects of a UE 115 as described with reference to FIGS. 1 through 5. Wireless device 605 may include receiver 610, UE UL transmission manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to uplink resource allocation techniques for shared radio frequency spectrum, etc.). Information may be passed on to other components of the device. The receiver 610 may be an example of aspects of the transceiver 935 described with reference to FIG. 9. The receiver 610 may include a single antenna, or it may include a set of antennas.

UE UL transmission manager 615 and/or at least some of its various sub-components may be implemented in hardware, software executed by a processor, firmware, or any combination thereof. If implemented in software executed by a processor, the functions of the UE UL transmission manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE UL transmission manager 615 and/or at least some of its various sub-components may be physically located at various positions, including being distributed such that portions of functions are implemented at different physical locations by one or more physical devices. In some examples, UE UL transmission manager 615 and/or at least some of its various sub-components may be a separate and distinct component in accordance with various aspects of the present disclosure. In other examples, UE UL transmission manager 615 and/or at least some of its various sub-components may be combined with one or more other hardware components, including but not limited to a receiver, a transmitter, a transceiver, one or more other components described in the present disclosure, or a combination thereof in accordance with various aspects of the present disclosure. UE UL transmission manager 615 may be an example of aspects of the UE UL transmission manager 915 described with reference to FIG. 9.

UE UL transmission manager 615 may select a frequency band of two or more available shared radio frequency spectrum bands for an uplink transmission from a UE to a base station, identify a resource allocation scheme of a set of available resource allocation schemes for the uplink transmission based on the selected frequency band, and transmit the uplink transmission from the UE to the base station using the identified resource allocation scheme.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
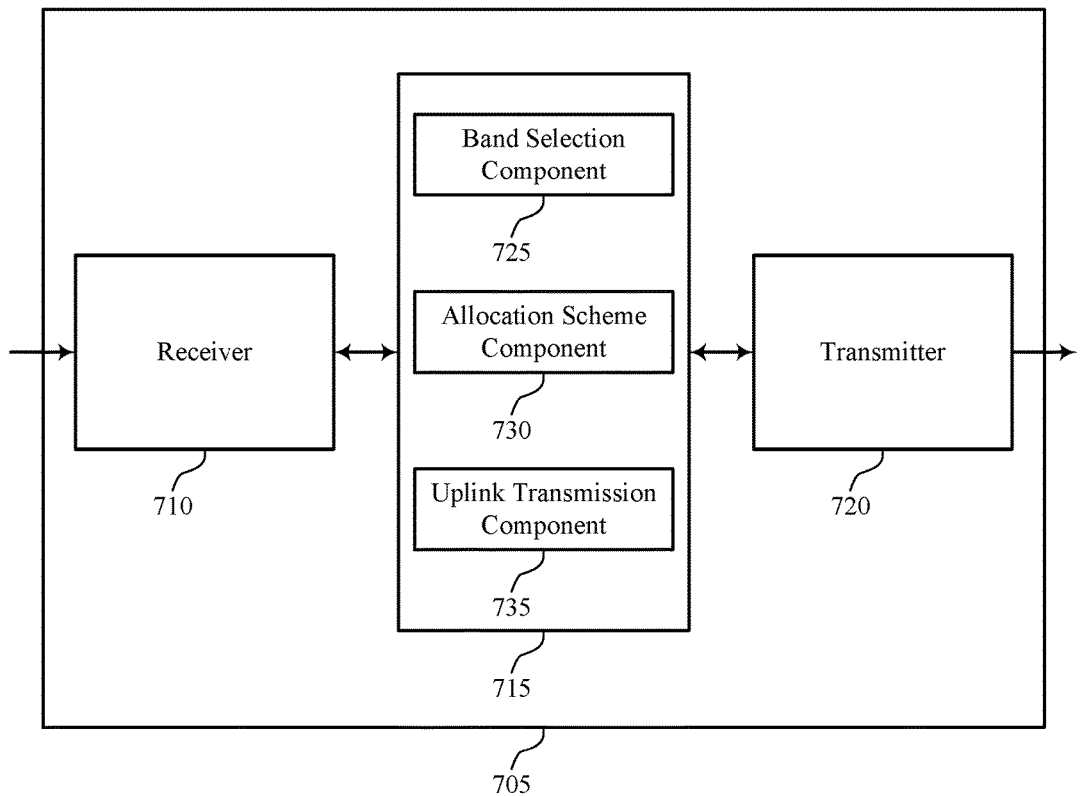

FIG. 7 shows a block diagram 700 of a wireless device 705 that supports uplink resource allocation techniques for shared radio frequency spectrum, in accordance with various aspects of the present disclosure. Wireless device 705 may be an example of aspects of a wireless device 605 or a UE 115 as described with reference to FIGS. 1 through 6 and 9. Wireless device 705 may include receiver 710, UE UL transmission manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to uplink resource allocation techniques for shared radio frequency spectrum, etc.). Information may be passed on to other components of the device. The receiver 710 may be an example of aspects of the transceiver 935 described with reference to FIG. 9. The receiver 710 may include a single antenna, or it may include a set of antennas.

UE UL transmission manager 715 may be an example of aspects of the UE UL transmission manager 915 described with reference to FIG. 9. UE UL transmission manager 715 may include band selection component 725, allocation scheme component 730, and uplink transmission component 735.

Band selection component 725 may select a frequency band of two or more available shared radio frequency spectrum bands for an uplink transmission from a UE to a base station. In some examples the two or more available shared radio frequency spectrum bands may have different energy emission limits.

Allocation scheme component 730 may identify a resource allocation scheme of a set of available resource allocation schemes for the uplink transmission based on the selected frequency band. In some cases, identifying the resource allocation scheme includes receiving a trigger to transmit the uplink transmission, determining whether to transmit the uplink transmission using a first frequency band of the two or more available shared radio frequency spectrum bands or a second frequency band of the two or more available shared radio frequency spectrum bands, and identifying the resource allocation scheme for the uplink transmission based on the first frequency band or the second frequency band to be used for the uplink transmission. In some cases, the trigger includes an indication to transmit one or more of an uplink control channel transmission, a sounding reference signal transmission, or a random access transmission. In some cases, the resource allocation scheme is pre-configured at the UE via a broadcast message provided by the base station or a specified resource allocation scheme.

Uplink transmission component 735 may transmit the uplink transmission from the UE to the base station using the identified resource allocation scheme and in some cases may transmit an uplink control channel with the uplink transmission that indicates the resource allocation scheme. In some cases, identifying the resource allocation scheme includes autonomously initiating the uplink transmission, determining whether to transmit the uplink transmission using a first frequency band of the two or more available shared radio frequency spectrum bands or a second frequency band of the two or more available shared radio frequency spectrum bands, and identifying the resource allocation scheme for the uplink transmission based on the first frequency band or the second frequency band to be used for the uplink transmission.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
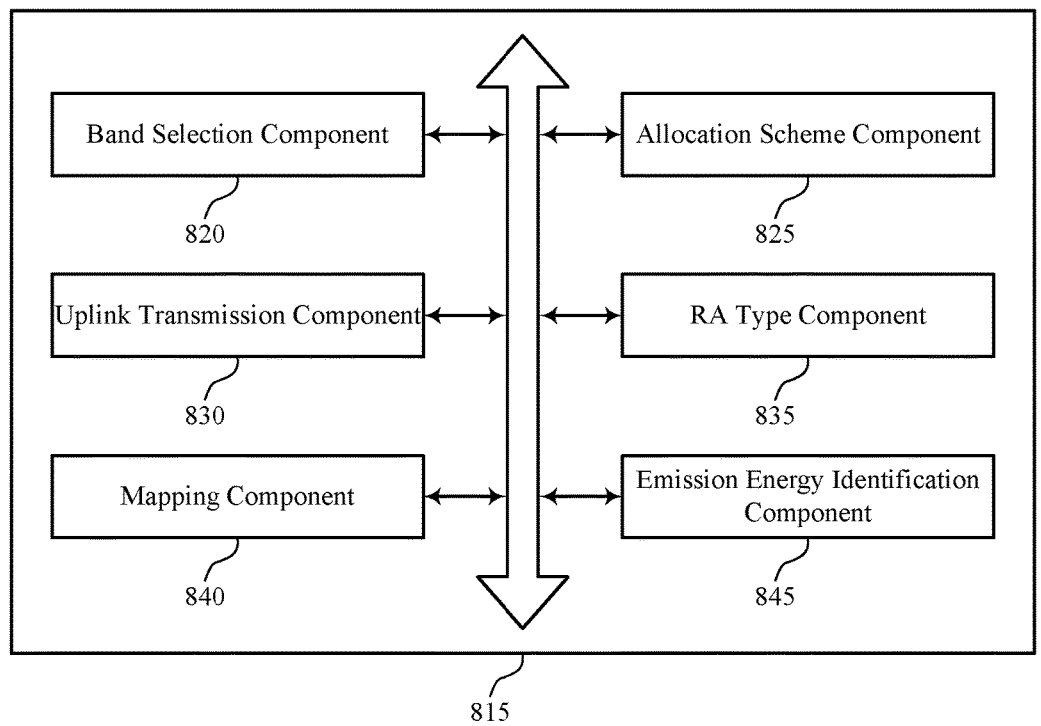
FIG. 8 shows a block diagram of a UE uplink transmission manager that supports uplink resource allocation techniques for shared radio frequency spectrum, in accordance with aspects of the present disclosure.

FIG. 8 shows a block diagram 800 of a UE UL transmission manager 815 that supports uplink resource allocation techniques for shared radio frequency spectrum, in accordance with various aspects of the present disclosure. The UE UL transmission manager 815 may be an example of aspects of a UE UL transmission manager 615, a UE UL transmission manager 715, or a UE UL transmission manager 915 described with reference to FIGS. 6, 7, and 9. The UE UL transmission manager 815 may include band selection component 820, allocation scheme component 825, uplink transmission component 830, RA type component 835, mapping component 840, and emission energy identification component 845. Each of these modules may communicate, directly or indirectly, with one another (e.g., via one or more buses).

Band selection component 820 may select a frequency band of two or more available shared radio frequency spectrum bands for an uplink transmission from a UE to a base station. In some examples the two or more available shared radio frequency spectrum bands may have different energy emission limits.

Allocation scheme component 825 may identify a resource allocation scheme of a set of available resource allocation schemes for the uplink transmission based on the selected frequency band. In some cases, identifying the resource allocation scheme includes receiving a trigger to transmit the uplink transmission, determining whether to transmit the uplink transmission using a first frequency band of the two or more available shared radio frequency spectrum bands or a second frequency band of the two or more available shared radio frequency spectrum bands, and identifying the resource allocation scheme for the uplink transmission based on the first frequency band or the second frequency band to be used for the uplink transmission. In some cases, the trigger includes an indication to transmit one or more of an uplink control channel transmission, a sounding reference signal transmission, or a random access transmission. In some cases, the resource allocation scheme is pre-configured at the UE via a broadcast message provided by the base station or a specified resource allocation scheme. In some cases, identifying the resource allocation scheme includes autonomously initiating the uplink transmission, determining whether to transmit the uplink transmission using a first frequency band of the two or more available shared radio frequency spectrum bands or a second frequency band of the two or more available shared radio frequency spectrum bands, and identifying the resource allocation scheme for the uplink transmission based on the first frequency band or the second frequency band to be used for the uplink transmission. In some cases, identifying the resource allocation scheme further includes identifying first uplink resources based on a first frequency band of the two or more available shared radio frequency spectrum bands in the uplink grant, identifying that a second frequency band of the two or more available shared radio frequency spectrum bands is to be used for the uplink transmission, and determining second uplink resources for the second frequency band based on a mapping from the first uplink resources.

Uplink transmission component 830 may transmit the uplink transmission from the UE to the base station using the identified resource allocation scheme and transmit an uplink control channel with the uplink transmission that indicates the resource allocation scheme.

RA type component 835 may receive an uplink grant from the base station, determine whether the uplink grant includes a RA type for a first frequency band of the two or more available shared radio frequency spectrum bands or a second frequency band of the two or more available shared radio frequency spectrum bands, and identify the resource allocation scheme for the uplink transmission based on the RA type. In some cases, the identifying the resource allocation scheme includes receiving an uplink grant from the base station, determining whether the uplink grant includes a first RA type for a first frequency band of the two or more available shared radio frequency spectrum bands or a second RA type associated with a dedicated radio frequency spectrum band, and identifying the resource allocation scheme for the uplink transmission based on the RA type.

Mapping component 840 may identify a second RB index of a second starting RB for a second contiguous subset of RBs for the uplink transmission based on both the first interlace of RBs and the second interlace of RBs. In some cases, the first uplink resources identify a set of uniform interlaces of RBs, and the mapping from the first uplink resources identifies non-uniform interlaces of RBs for the uplink transmission. In some cases, the first uplink resources identify first interlace of RBs, and the mapping from the first uplink resources identifies at least two clusters of contiguous RBs for the uplink transmission based on the first interlace of RBs. In some cases, the determining whether the uplink grant includes the first RA type or the second RA type includes identifying that a second frequency band of the two or more available shared radio frequency spectrum bands is to be used for the uplink transmission, and determining second uplink resources for the second frequency band based on a mapping from first uplink resources indicated in the uplink grant. In some cases, the first uplink resources identify a first interlace of RBs, and the mapping from the first uplink resources identifies a RB index of a starting RB for a contiguous set of RBs for the uplink transmission based on the first interlace of RBs. In some cases, the first uplink resources identify a first interlace of RBs, and the mapping from the first uplink resources identifies a RB index of a starting RB for a contiguous set of RBs for the uplink transmission based on the first interlace of RBs. In some cases, the mapping from the first uplink resources further identifies a shift to be applied to the starting RB. In some cases, the one or more of the interlace offset or the shift are indicated in the uplink grant, are semi-statically configured at the UE via a SIB or dedicated UE signaling, or are fixed according to a specified offset or look-up table. In some cases, the first uplink resources identify a first interlace of RBs and a second interlace of RBs, and the mapping from the first uplink resources identifies a RB index of a starting RB for a contiguous set of RBs for the uplink transmission based on both the first interlace of RBs and the second interlace of RBs. In some cases, the first uplink resources identify a first interlace of RBs and a second interlace of RBs, and the mapping from the first uplink resources includes: identifying a first RB index of a first starting RB for a first contiguous subset of RBs for the uplink transmission based on both the first interlace of RBs and the second interlace of RBs. In some cases, the mapping from the first uplink resources further identifies an interlace offset for the starting RB.

Emission energy identification component 845 may select the second uplink resources to provide out-of-band emissions having an energy that is below an energy limit associated with the second frequency band.

Figure 9:
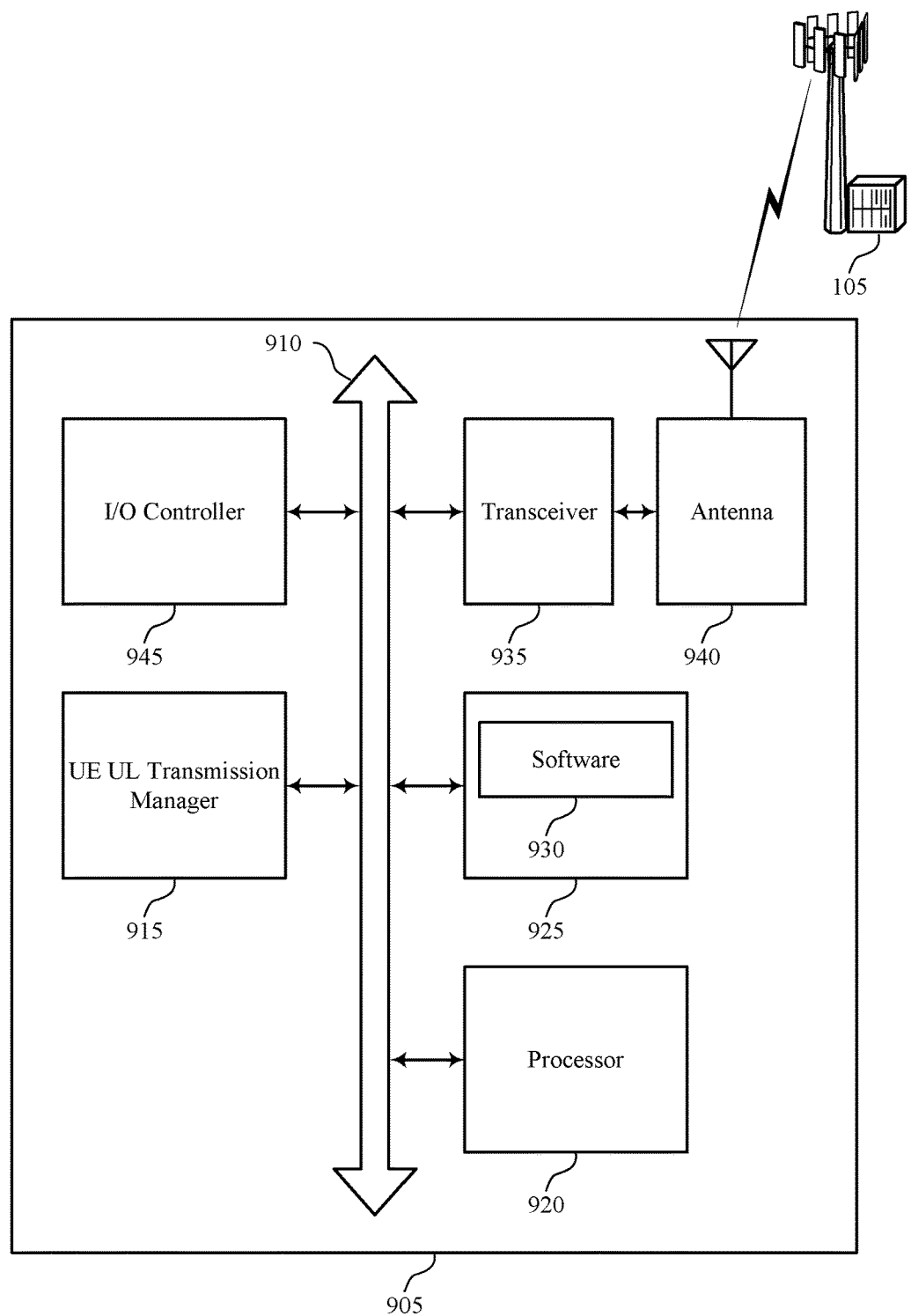
FIG. 9 illustrates a block diagram of a system including a UE that supports uplink resource allocation techniques for shared radio frequency spectrum, in accordance with aspects of the present disclosure.

FIG. 9 shows a diagram of a system 900 including a device 905 that supports uplink resource allocation techniques for shared radio frequency spectrum, in accordance with various aspects of the present disclosure. Device 905 may be an example of or include the components of wireless device 605, wireless device 705, or a UE 115 as described, e.g., with reference to FIGS. 1 through 7. Device 905 may include components for bi-directional voice and data communications including components for transmitting and receiving communications, including UE UL transmission manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory (e.g., memory 925) to perform various functions (e.g., functions or tasks supporting uplink resource allocation techniques for shared radio frequency spectrum).

Memory 925 may include random access memory (RAM) and read only memory (ROM). The memory 925 may store computer-readable, computer-executable code (e.g., software 930) including instructions that, when executed (e.g., by the processor 920), cause the device 905 to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support uplink resource allocation techniques for shared radio frequency spectrum. Software 930 may be stored in a non-transitory computer-readable medium such as system memory or other memory. In some cases, the software 930 may not be directly executable by the processor 920, but may cause a computer (e.g., when compiled and executed) to perform functions described herein.

Transceiver 935 may communicate bi-directionally, via one or more antennas, wired, or wireless links as described herein. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
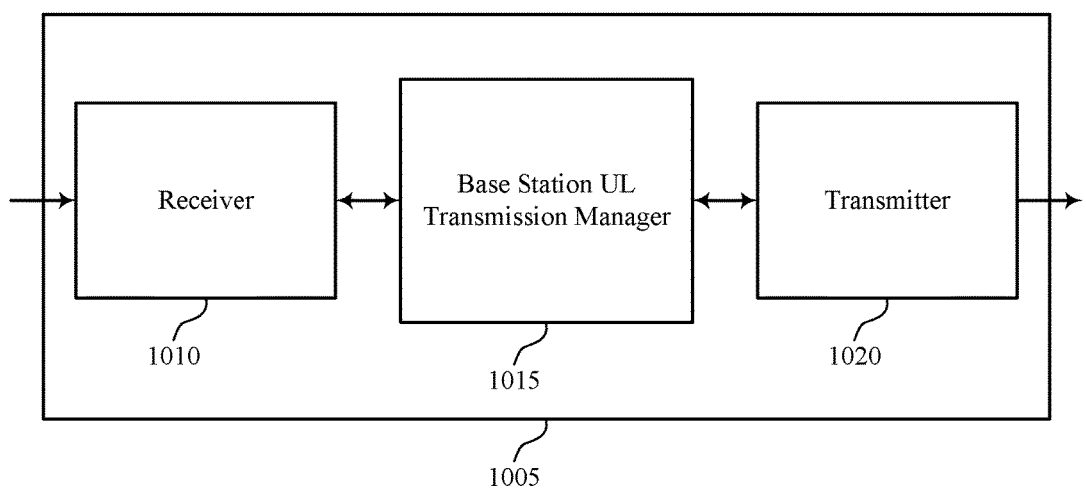
FIGS. 10 and 11 show block diagrams of devices that support uplink resource allocation techniques for shared radio frequency spectrum, in accordance with aspects of the present disclosure.

FIG. 10 shows a block diagram 1000 of a wireless device 1005 that supports uplink resource allocation techniques for shared radio frequency spectrum, in accordance with various aspects of the present disclosure. Wireless device 1005 may be an example of aspects of a base station 105 as described with reference to FIGS. 1 through 5. Wireless device 1005 may include receiver 1010, base station UL transmission manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to uplink resource allocation techniques for shared radio frequency spectrum, etc.). Information may be passed on to other components of the device. The receiver 1010 may be an example of aspects of the transceiver 1335 described with reference to FIG. 13. The receiver 1010 may include a single antenna, or it may include a set of antennas.

Base station UL transmission manager 1015 and/or at least some of its various sub-components may be implemented in hardware, software executed by a processor, firmware, or any combination thereof. If implemented in software executed by a processor, the functions of the base station UL transmission manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station UL transmission manager 1015 and/or at least some of its various sub-components may be physically located at various positions, including being distributed such that portions of functions are implemented at different physical locations by one or more physical devices. In some examples, base station UL transmission manager 1015 and/or at least some of its various sub-components may be a separate and distinct component in accordance with various aspects of the present disclosure. In other examples, base station UL transmission manager 1015 and/or at least some of its various sub-components may be combined with one or more other hardware components, including but not limited to a receiver, a transmitter, a transceiver, one or more other components described in the present disclosure, or a combination thereof in accordance with various aspects of the present disclosure. Base station UL transmission manager 1015 may be an example of aspects of the base station UL transmission manager 1315 described with reference to FIG. 13.

Base station UL transmission manager 1015 may select a frequency band of two or more available shared radio frequency spectrum bands to be used by a UE for an uplink transmission to the base station, identify a resource allocation scheme for the uplink transmission based on the selected frequency band, and configure the UE to transmit the uplink transmission using the identified resource allocation scheme.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
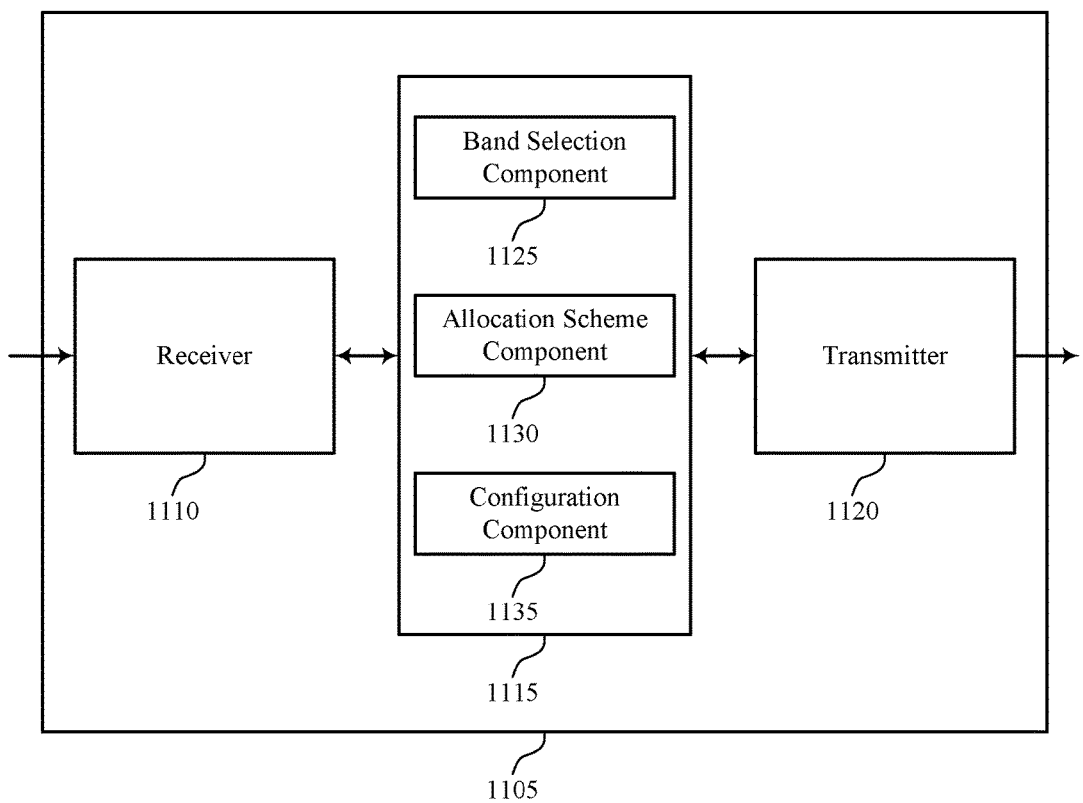

FIG. 11 shows a block diagram 1100 of a wireless device 1105 that supports uplink resource allocation techniques for shared radio frequency spectrum, in accordance with various aspects of the present disclosure. Wireless device 1105 may be an example of aspects of a wireless device 1005 or a base station 105 as described with reference to FIGS. 1 through 5 and 10. Wireless device 1105 may include receiver 1110, base station UL transmission manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to uplink resource allocation techniques for shared radio frequency spectrum, etc.). Information may be passed on to other components of the device. The receiver 1110 may be an example of aspects of the transceiver 1335 described with reference to FIG. 13. The receiver 1110 may include a single antenna, or it may include a set of antennas.

Base station UL transmission manager 1115 may be an example of aspects of the base station UL transmission manager 1315 described with reference to FIG. 13. Base station UL transmission manager 1115 may include band selection component 1125, allocation scheme component 1130, and configuration component 1135.

Band selection component 1125 may select a frequency band of two or more available shared radio frequency spectrum bands to be used by a UE for an uplink transmission to the base station. In some examples the two or more available shared radio frequency spectrum bands may have different energy emission limits.

Allocation scheme component 1130 may identify a resource allocation scheme for the uplink transmission based on the selected frequency band and allocate uplink resources for the uplink transmission. In some cases, the identifying the resource allocation scheme includes allocating uplink resources for the uplink transmission, generating an uplink grant that includes a first RA type for a first frequency band of the two or more available shared radio frequency spectrum bands or a second RA type associated with a dedicated radio frequency spectrum band, where the resource allocation scheme for the uplink transmission is indicated based on the RA type, and transmitting the uplink grant to the UE.

Configuration component 1135 may configure the UE to transmit the uplink transmission using the identified resource allocation scheme, configure the UE to determine whether the uplink grant includes the first RA type or the second RA type based on whether a first frequency band or a second frequency band of the two or more available shared radio frequency spectrum bands is to be used for the uplink transmission and to determine uplink resources for the uplink transmission based on the RA type, configure the UE to transmit one or more of an uplink control channel transmission, a SRS, or a random access transmission using a first frequency band of the two or more available shared radio frequency spectrum bands or a second frequency band of the two or more available shared radio frequency spectrum bands, and configure the UE to identify the resource allocation scheme for the uplink transmission based on the first frequency band or the second frequency band to be used for the uplink transmission.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
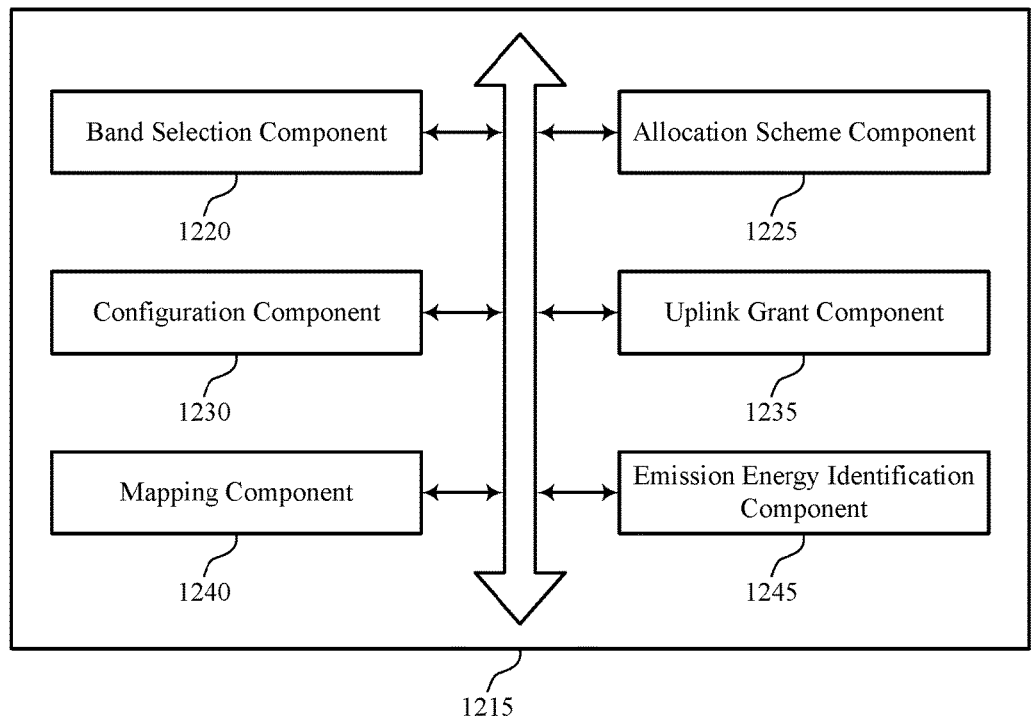
FIG. 12 shows a block diagram of a base station uplink transmission manager that supports uplink resource allocation techniques for shared radio frequency spectrum, in accordance with aspects of the present disclosure.

FIG. 12 shows a block diagram 1200 of a base station UL transmission manager 1215 that supports uplink resource allocation techniques for shared radio frequency spectrum, in accordance with various aspects of the present disclosure. The base station UL transmission manager 1215 may be an example of aspects of a base station UL transmission manager 1015, 1115, or 1315 described with reference to FIGS. 10, 11, and 13. The base station UL transmission manager 1215 may include band selection component 1220, allocation scheme component 1225, configuration component 1230, uplink grant component 1235, mapping component 1240, and emission energy identification component 1245. Each of these modules may communicate, directly or indirectly, with one another (e.g., via one or more buses).

Band selection component 1220 may select a frequency band of two or more available shared radio frequency spectrum bands to be used by a UE for an uplink transmission to the base station. In some examples the two or more available shared radio frequency spectrum bands may have different energy emission limits.

Allocation scheme component 1225 may identify a resource allocation scheme for the uplink transmission based on the selected frequency band and allocate uplink resources for the uplink transmission. In some cases, the identifying the resource allocation scheme includes allocating uplink resources for the uplink transmission, generating an uplink grant that includes a first RA type for a first frequency band of the two or more available shared radio frequency spectrum bands or a second RA type associated with a dedicated radio frequency spectrum band, where the resource allocation scheme for the uplink transmission is indicated based on the RA type, and transmitting the uplink grant to the UE.

Configuration component 1230 may configure the UE to transmit the uplink transmission using the identified resource allocation scheme, configure the UE to determine whether the uplink grant includes the first RA type or the second RA type based on whether a first frequency band or a second frequency band of the two or more available shared radio frequency spectrum bands is to be used for the uplink transmission and to determine uplink resources for the uplink transmission based on the RA type, configure the UE to transmit one or more of an uplink control channel transmission, a SRS, or a random access transmission using a first frequency band of the two or more available shared radio frequency spectrum bands or a second frequency band of the two or more available shared radio frequency spectrum bands, and configure the UE to identify the resource allocation scheme for the uplink transmission based on the first frequency band or the second frequency band to be used for the uplink transmission.

Uplink grant component 1235 may generate an uplink grant that includes a RA type for a first frequency band of the two or more available shared radio frequency spectrum bands or a second frequency band of the two or more available shared radio frequency spectrum bands, where the resource allocation scheme for the uplink transmission is indicated based on the RA type and transmit the uplink grant to the UE.

Mapping component 1240 may map second uplink resources for a second frequency band of the two or more available shared radio frequency spectrum bands to first uplink resources for a first frequency band of the two or more available shared radio frequency spectrum bands, configure the UE to identify the second uplink resources based on the mapping and an indication that the second frequency band is to be used for the uplink transmission, and map second uplink resources for the second frequency band to first uplink resources indicated in the uplink grant. In some cases, the first uplink resources identify a first interlace of RBs, and the mapping from the first uplink resources identifies a RB index of a starting RB for a contiguous set of RBs for the uplink transmission based on the first interlace of RBs. In some cases, the first uplink resources identify a set of uniform interlaces of RBs, and the mapping from the first uplink resources identifies non-uniform interlaces of RBs for the uplink transmission. In some cases, the first uplink resources identify first interlace of RBs, and the mapping from the first uplink resources identifies at least two clusters of contiguous RBs for the uplink transmission based on the first interlace of RBs. In some cases, the first uplink resources identify a first interlace of RBs), and the mapping from the first uplink resources identifies, based on a first interlace or RBs, one or more of a RB index of a starting RB for a contiguous set of RBs for the uplink transmission, an interlace offset for the starting RB, or a shift to be applied to the starting RB. In some cases, one or more of the interlace offset or the shift are indicated in the uplink grant or are semi-statically configured at the UE.

Emission energy identification component 1245 may select the second uplink resources to provide out-of-band emissions having an energy that is below a threshold energy level associated with the second frequency band.

Figure 13:
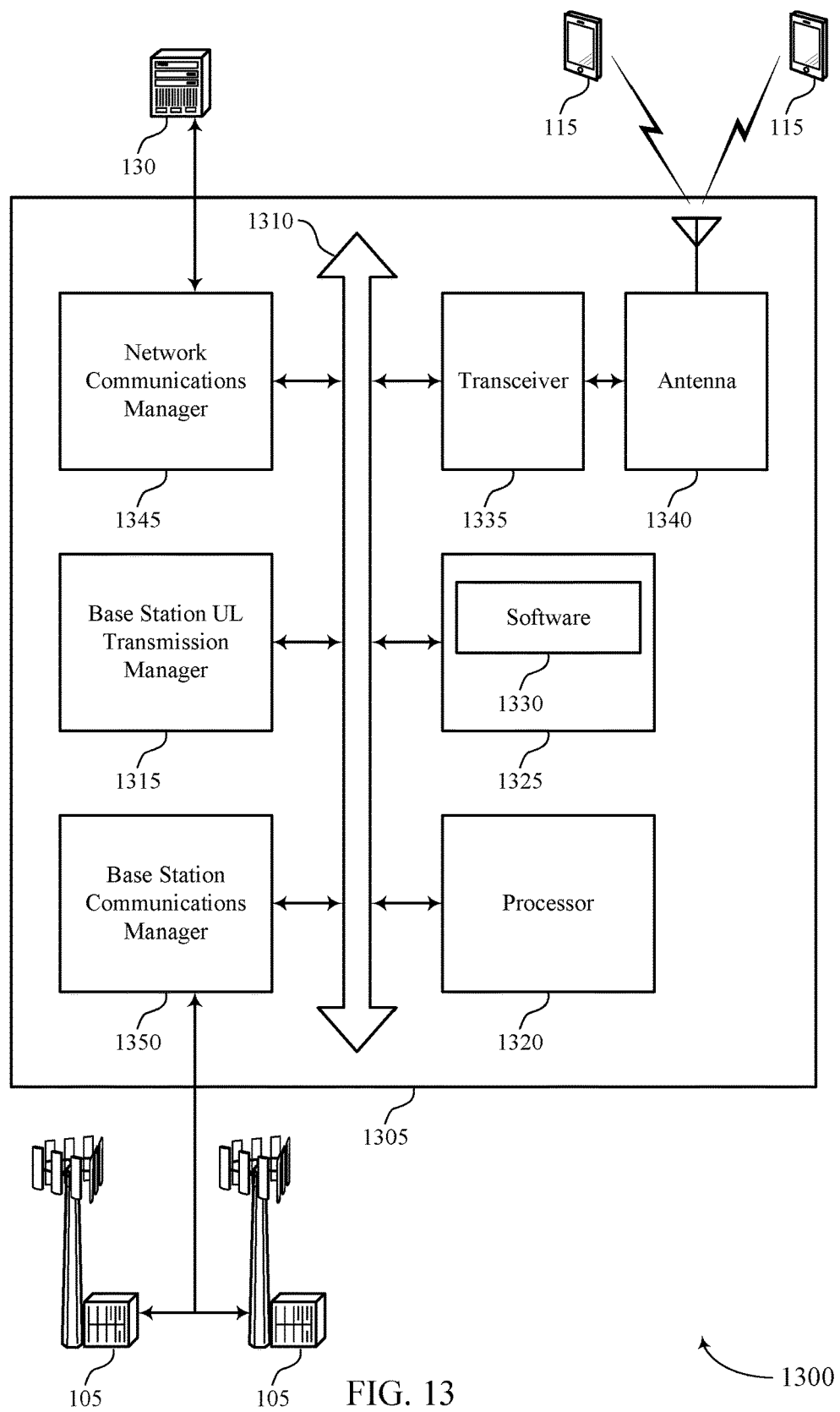
FIG. 13 illustrates a block diagram of a system including a base station that supports uplink resource allocation techniques for shared radio frequency spectrum, in accordance with aspects of the present disclosure.

FIG. 13 shows a diagram of a system 1300 including a device 1305 that supports uplink resource allocation techniques for shared radio frequency spectrum, in accordance with various aspects of the present disclosure. Device 1305 may be an example of or include the components of base station 105 as described, e.g., with reference to FIGS. 1 through 5 and 10 through 12. Device 1305 may include components for bi-directional voice and data communications including components for transmitting and receiving communications, including base station UL transmission manager 1315, processor 1320, memory 1325, software 1330, transceiver 1335, antenna 1340, network communications manager 1345, and base station communications manager 1350. These components may be in electronic communication via one or more busses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory (e.g., memory 1325) to perform various functions (e.g., functions or tasks supporting uplink resource allocation techniques for shared radio frequency spectrum).

Memory 1325 may include RAM and ROM. The memory 1325 may store computer-readable, computer-executable code (e.g., software 1330) including instructions that, when executed (e.g., by the processor 1320), cause the device 1305 to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support uplink resource allocation techniques for shared radio frequency spectrum. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described herein. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Base station communications manager 1350 may manage communications with other base station 105, and may include a controller or scheduler for controlling communications with UEs 115 in cooperation with other base stations 105. For example, the base station communications manager 1350 may coordinate scheduling for transmissions to UEs 115 for various interference mitigation techniques such as beamforming or joint transmission. In some examples, base station communications manager 1350 may provide an X2 interface within an LTE or LTE-A wireless communication network technology to provide communication between base stations 105.

Figure 14:
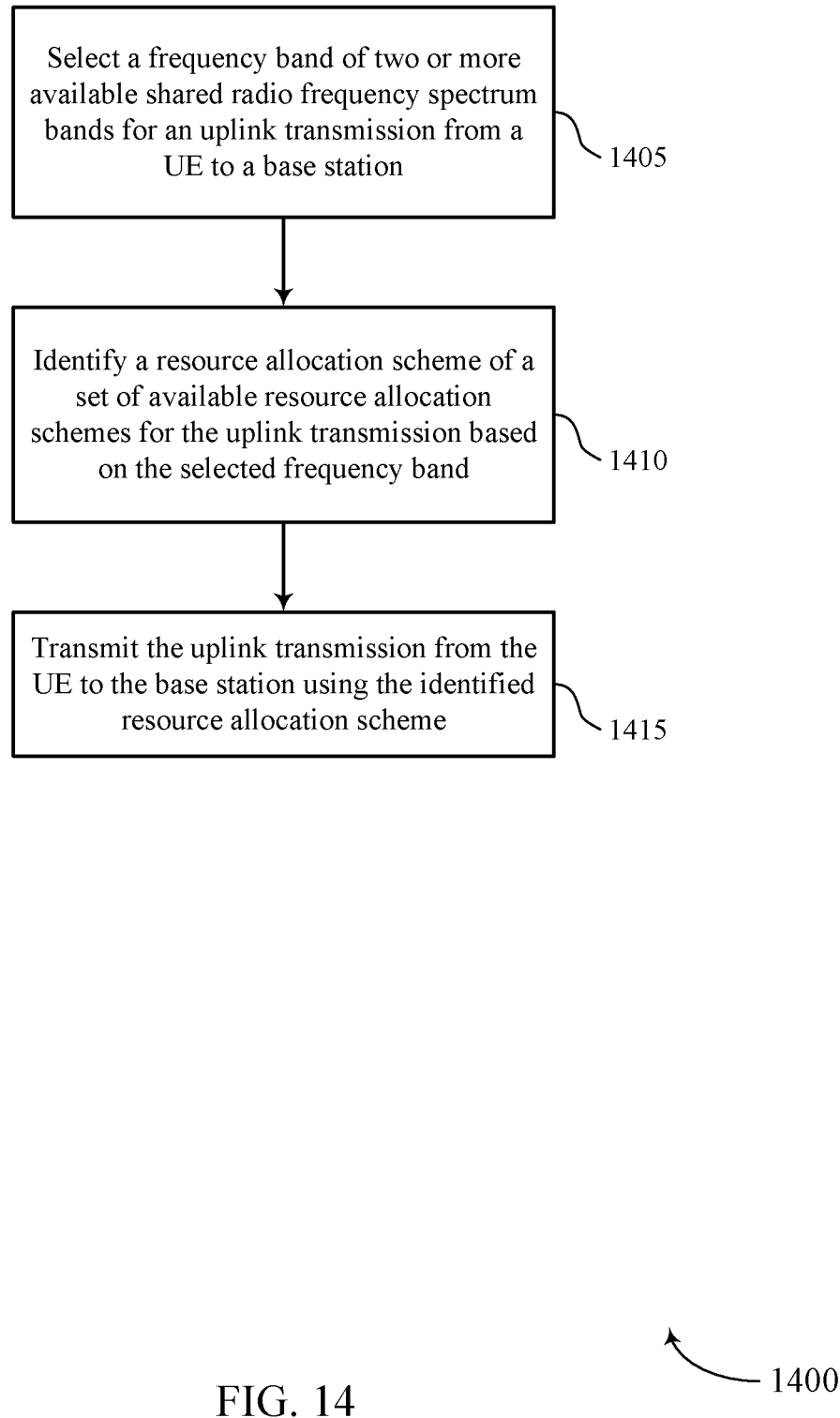
FIGS. 14 through 17 illustrate methods for uplink resource allocation techniques for shared radio frequency spectrum, in accordance with aspects of the present disclosure.

FIG. 14 shows a flowchart illustrating a method 1400 for uplink resource allocation techniques for shared radio frequency spectrum, in accordance with various aspects of the present disclosure. The operations of method 1400 may be implemented by a UE 115 or its components as described herein. For example, operations of method 1400 may be performed by a UE UL transmission manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At 1405 the UE 115 may select a frequency band of two or more available shared radio frequency spectrum bands for an uplink transmission from the UE 115 to a base station 115. In some examples the two or more available shared radio frequency spectrum bands may have different energy emission limits. The operations of 1405 may be performed according to the methods described with reference to FIGS. 1 through 5. In certain examples, aspects of the operations of 1405 may be performed by a band selection component as described with reference to FIGS. 6 through 9.

At 1410 the UE 115 may identify a resource allocation scheme of a plurality of available resource allocation schemes for the uplink transmission based at least in part on the selected frequency band. The operations of 1410 may be performed according to the methods described with reference to FIGS. 1 through 5. In certain examples, aspects of the operations of 1410 may be performed by an allocation scheme component as described with reference to FIGS. 6 through 9. In some cases, the identifying the resource allocation scheme further comprises identifying first uplink resources based on a first frequency band of the two or more available shared radio frequency spectrum bands in an uplink grant, identifying that a second frequency band of the two or more available shared radio frequency spectrum bands is to be used for the uplink transmission, and determining second uplink resources for the second frequency band based on a mapping from the first uplink resources At 1415 the UE 115 may transmit the uplink transmission from the UE 115 to the base station 105 using the identified resource allocation scheme. The operations of 1415 may be performed according to the methods described with reference to FIGS. 1 through 5. In certain examples, aspects of the operations of 1415 may be performed by a uplink transmission component as described with reference to FIGS. 6 through 9.

Figure 15:
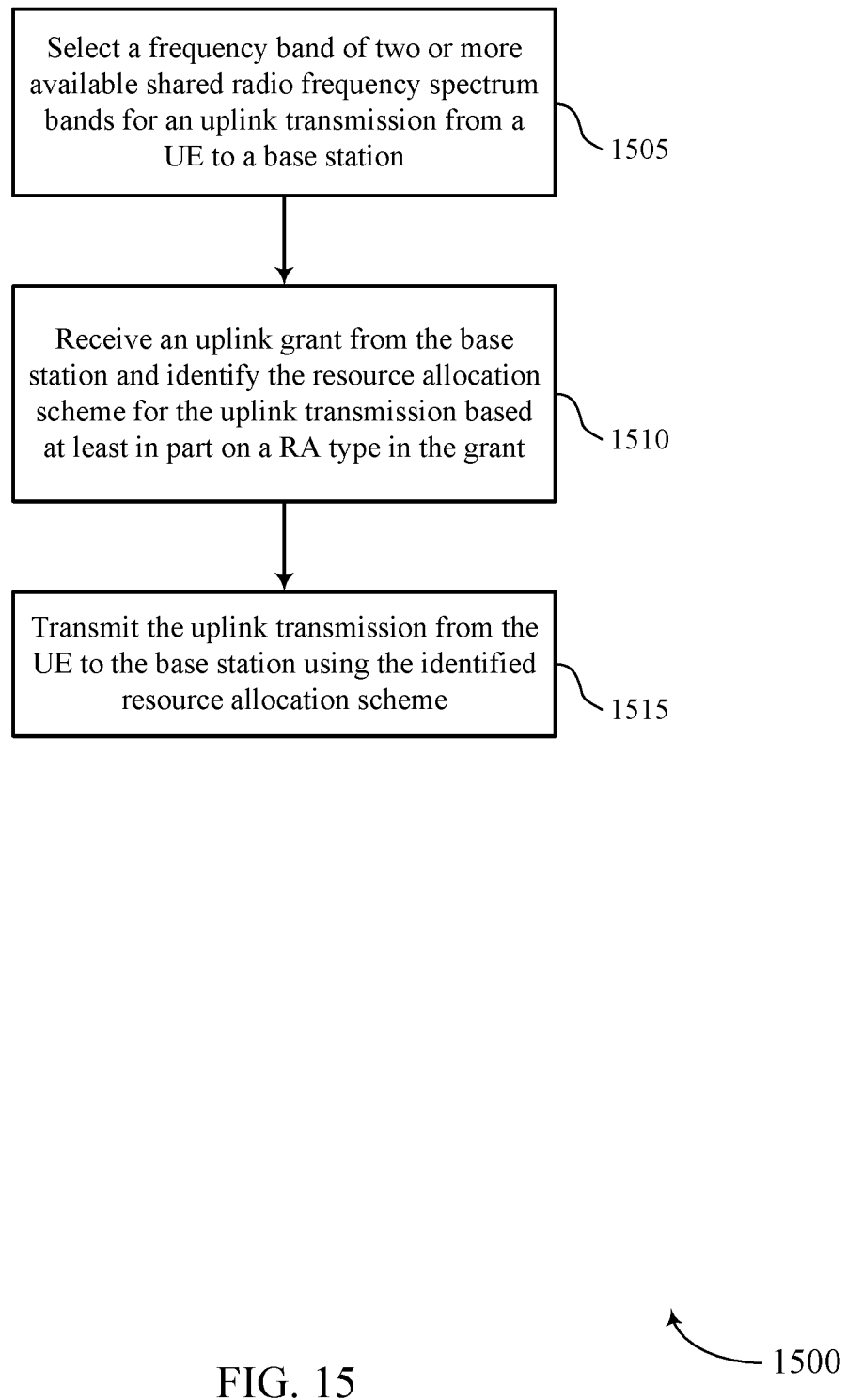

FIG. 15 shows a flowchart illustrating a method 1500 for uplink resource allocation techniques for shared radio frequency spectrum, in accordance with various aspects of the present disclosure. The operations of method 1500 may be implemented by a UE 115 or its components as described herein. For example, operations of method 1500 may be performed by a UE UL transmission manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At 1505 the UE 115 may select a frequency band of two or more available shared radio frequency spectrum bands for an uplink transmission from the UE 115 to a base station 105. In some examples the two or more available shared radio frequency spectrum bands may have different energy emission limits. The operations of 1505 may be performed according to the methods described with reference to FIGS. 1 through 5. In certain examples, aspects of the operations of 1505 may be performed by a band selection component as described with reference to FIGS. 6 through 9.

At 1510 the UE 115 may receive an uplink grant from the base station 105 and identify the resource allocation scheme for the uplink transmission based at least in part on a RA type in the grant. The operations of 1510 may be performed according to the methods described with reference to FIGS. 1 through 5. In certain examples, aspects of the operations of 1510 may be performed by an allocation scheme component as described with reference to FIGS. 6 through 9. In some cases, the UE 115 may determine whether the uplink grant includes a RA type for a first frequency band of the two or more available shared radio frequency spectrum bands or a second frequency band of the two or more available shared radio frequency spectrum bands, and identify the resource allocation scheme for the uplink transmission based at least in part on the RA type.

At 1515 the UE 115 may transmit the uplink transmission from the UE 115 to the base station 105 using the identified resource allocation scheme. The operations of 1515 may be performed according to the methods described with reference to FIGS. 1 through 5. In certain examples, aspects of the operations of 1515 may be performed by a uplink transmission component as described with reference to FIGS. 6 through 9.

Figure 16:
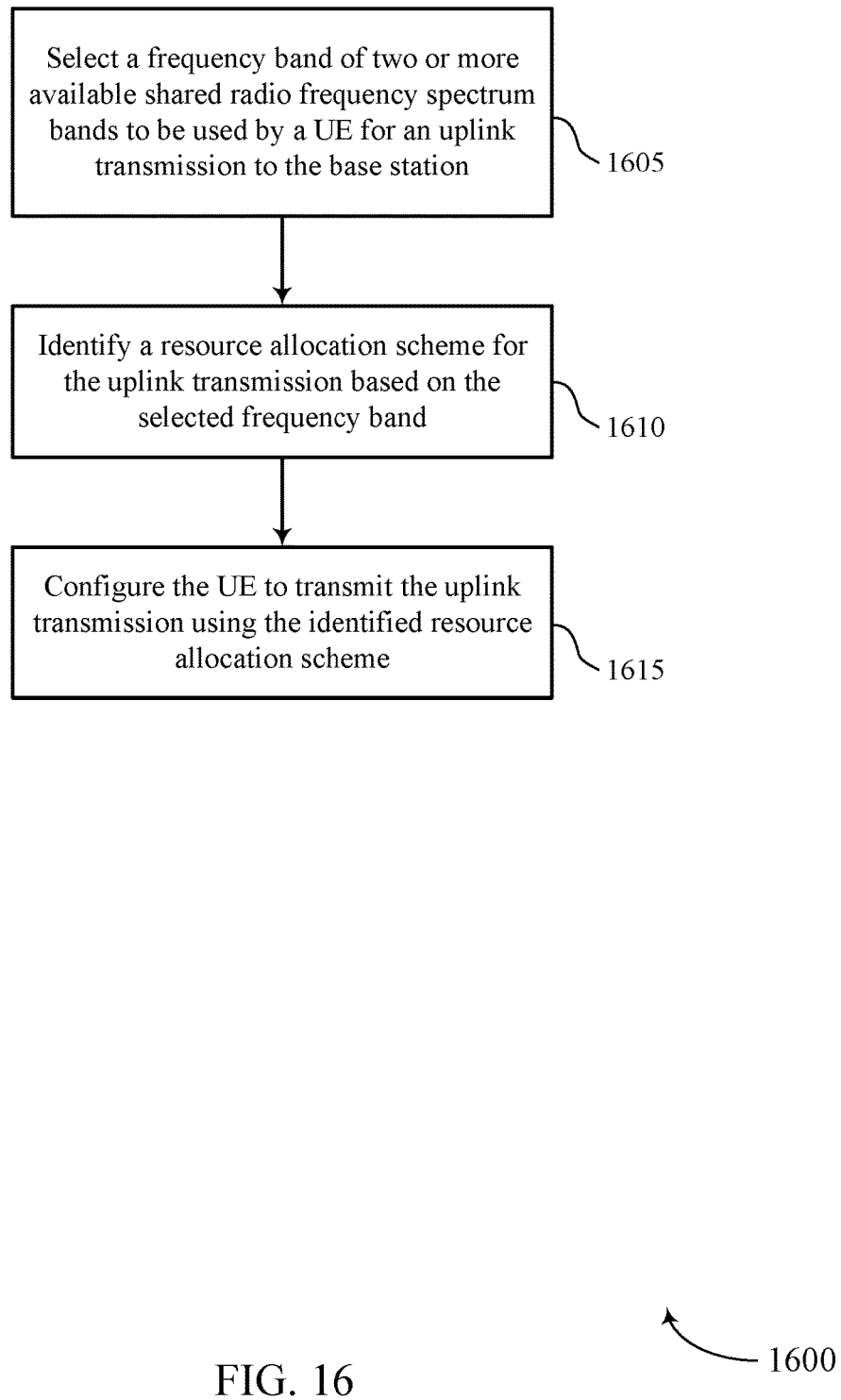

FIG. 16 shows a flowchart illustrating a method 1600 for uplink resource allocation techniques for shared radio frequency spectrum, in accordance with various aspects of the present disclosure. The operations of method 1600 may be implemented by a base station 105 or its components as described herein. For example, operations of method 1600 may be performed by a base station UL transmission manager as described with reference to FIGS. 10 through 13. In some examples, a base station 105 may execute a set of codes to control the functional elements of the device to perform the functions described below. Additionally or alternatively, the base station 105 may perform aspects the functions described below using special-purpose hardware.

At 1605 the base station 105 may select a frequency band of two or more available shared radio frequency spectrum bands to be used by a UE 115 for an uplink transmission to the base station 105. In some examples the two or more available shared radio frequency spectrum bands may have different energy emission limits. The operations of 1605 may be performed according to the methods described with reference to FIGS. 1 through 5. In certain examples, aspects of the operations of 1605 may be performed by a band selection component as described with reference to FIGS. 10 through 13.

At 1610 the base station 105 may identify a resource allocation scheme for the uplink transmission based at least in part on the selected frequency band. The operations of 1610 may be performed according to the methods described with reference to FIGS. 1 through 5. In certain examples, aspects of the operations of 1610 may be performed by an allocation scheme component as described with reference to FIGS. 10 through 13.

At 1615 the base station 105 may configure the UE 115 to transmit the uplink transmission using the identified resource allocation scheme. The operations of 1615 may be performed according to the methods described with reference to FIGS. 1 through 5. In certain examples, aspects of the operations of 1615 may be performed by a configuration component as described with reference to FIGS. 10 through 13.

Figure 17:
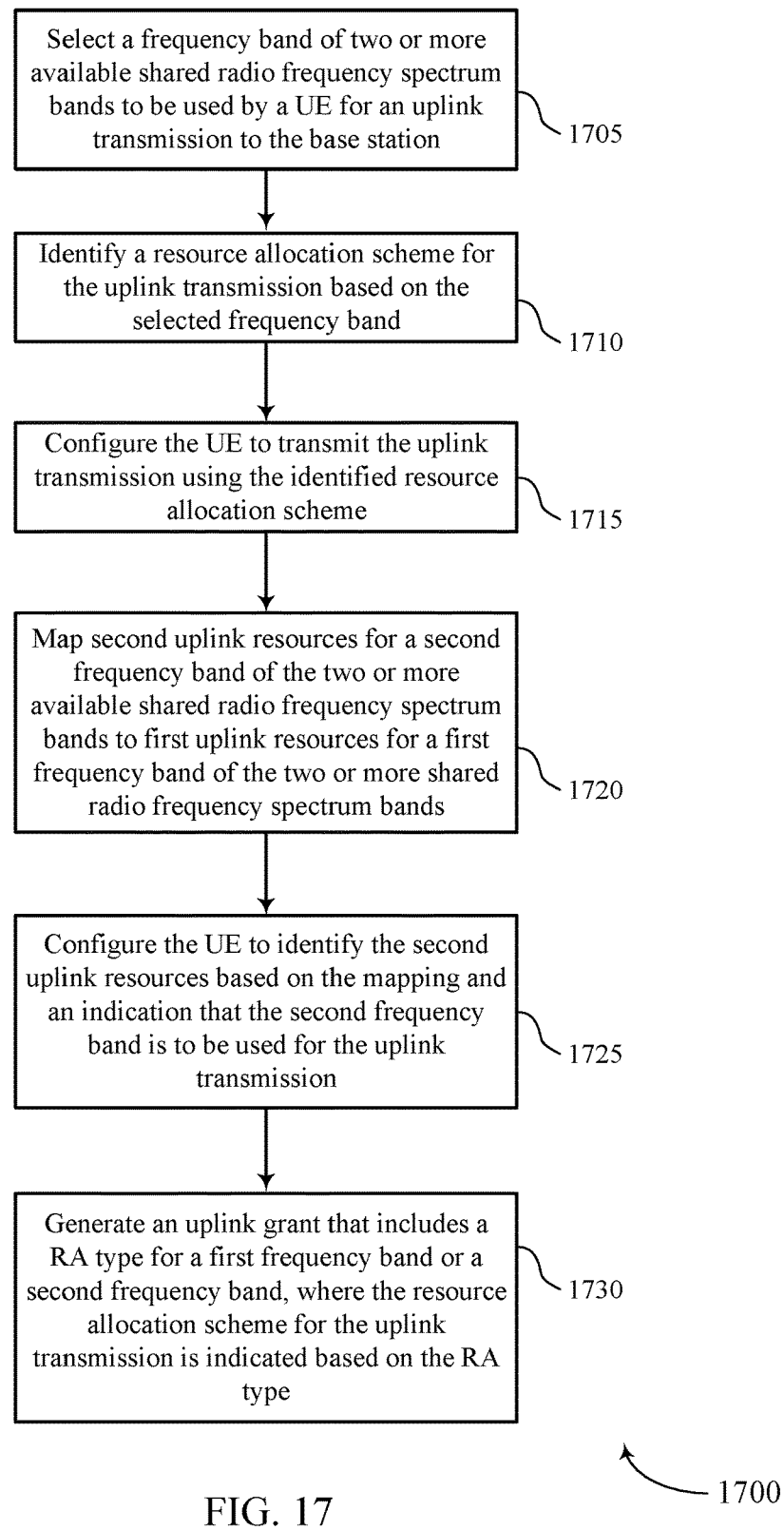

FIG. 17 shows a flowchart illustrating a method 1700 for uplink resource allocation techniques for shared radio frequency spectrum, in accordance with various aspects of the present disclosure. The operations of method 1700 may be implemented by a base station 105 or its components as described herein. For example, operations of method 1700 may be performed by a base station UL transmission manager as described with reference to FIGS. 10 through 13. In some examples, a base station 105 may execute a set of codes to control the functional elements of the device to perform the functions described below. Additionally or alternatively, the base station 105 may perform aspects the functions described below using special-purpose hardware.

At 1705 the base station 105 may select a frequency band of two or more available shared radio frequency spectrum bands to be used by a UE 115 for an uplink transmission to the base station. In some examples the two or more available shared radio frequency spectrum bands may have different energy emission limits. The operations of 1705 may be performed according to the methods described with reference to FIGS. 1 through 5. In certain examples, aspects of the operations of 1705 may be performed by a band selection component as described with reference to FIGS. 10 through 13.

At 1710 the base station 105 may identify a resource allocation scheme for the uplink transmission based at least in part on the selected frequency band. The operations of 1710 may be performed according to the methods described with reference to FIGS. 1 through 5. In certain examples, aspects of the operations of 1710 may be performed by an allocation scheme component as described with reference to FIGS. 10 through 13.

At 1715 the base station 105 may configure the UE 115 to transmit the uplink transmission using the identified resource allocation scheme. The operations of 1715 may be performed according to the methods described with reference to FIGS. 1 through 5. In certain examples, aspects of the operations of 1715 may be performed by a configuration component as described with reference to FIGS. 10 through 13.

At 1720 the base station 105 may map second uplink resources for a second frequency band of the two or more available shared radio frequency spectrum bands to first uplink resources for a first frequency band of the two or more available shared radio frequency spectrum bands. The operations of 1720 may be performed according to the methods described with reference to FIGS. 1 through 5. In certain examples, aspects of the operations of 1720 may be performed by a mapping component as described with reference to FIGS. 10 through 13.

At 1725 the base station 105 may configure the UE 115 to identify the second uplink resources based on the mapping and an indication that the second frequency band is to be used for the uplink transmission. The operations of 1725 may be performed according to the methods described with reference to FIGS. 1 through 5. In certain examples, aspects of the operations of 1725 may be performed by a mapping component as described with reference to FIGS. 10 through 13.

At 1730 the base station 105 may generate an uplink grant that includes a RA type for a first frequency band of the two or more available shared radio frequency spectrum bands or a second frequency band of the two or more available shared radio frequency spectrum bands, wherein the resource allocation scheme for the uplink transmission is indicated based at least in part on the RA type. The operations of 1730 may be performed according to the methods described with reference to FIGS. 1 through 5. In certain examples, aspects of the operations of 1730 may be performed by a uplink grant component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, an eNB, a gNB, a Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a CSG, UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    selecting a frequency band of two or more available shared radio frequency spectrum bands for an uplink transmission from a user equipment (UE) to a base station;
    identifying a resource allocation scheme of a plurality of available resource allocation schemes for the uplink transmission based at least in part on the selected frequency band; and
    transmitting the uplink transmission from the UE to the base station using the identified resource allocation scheme.

2. The method of claim 1, wherein the identifying the resource allocation scheme comprises:
    receiving an uplink grant from the base station;
    determining whether the uplink grant includes a resource allocation (RA) type for a first frequency band of the two or more available shared radio frequency spectrum bands or an RA type for a second frequency band of the two or more available shared radio frequency spectrum bands; and
    identifying the resource allocation scheme for the uplink transmission based at least in part on the determined RA type.

3. The method of claim 2, wherein the identifying the resource allocation scheme further comprises:
    identifying first uplink resources based on the first frequency band of the two or more available shared radio frequency spectrum bands in the uplink grant;
    identifying that the second frequency band of the two or more available shared radio frequency spectrum bands is to be used for the uplink transmission; and determining second uplink resources for the second frequency band based on a mapping from the first uplink resources.

4. The method of claim 3, wherein the first uplink resources identify a first interlace of resource blocks (RBs), and the mapping from the first uplink resources identifies a RB index of a starting RB for a set of RBs contiguous in the frequency domain for the uplink transmission based at least in part on the first interlace of RBs.

5. The method of claim 3, wherein the first uplink resources identify a set of interlaces of resource blocks (RBs) uniformly distributed in the frequency domain, and the mapping from the first uplink resources identifies interlaces of RBs non-uniformly distributed in the frequency domain for the uplink transmission.

6. The method of claim 3, wherein the first uplink resources identify first interlace of resource blocks (RBs), and the mapping from the first uplink resources identifies at least two clusters of RBs contiguous in the frequency domain for the uplink transmission based at least in part on the first interlace of RBs.

7. The method of claim 3, wherein the second uplink resources are selected to provide out-of-band emissions having an energy that is below an energy limit associated with the second frequency band.

8. The method of claim 1, wherein the identifying the resource allocation scheme comprises:
receiving an uplink grant from the base station;
determining whether the uplink grant includes a first resource allocation (RA) type for a first frequency band of the two or more available shared radio frequency spectrum bands or a second RA type associated with a dedicated radio frequency spectrum band; and
identifying the resource allocation scheme for the uplink transmission based at least in part on the determined RA type.

9. The method of claim 8, wherein the determining whether the uplink grant includes the first RA type or the second RA type comprises:
identifying that a second frequency band of the two or more available shared radio frequency spectrum bands is to be used for the uplink transmission; and
determining second uplink resources for the second frequency band based on a mapping from first uplink resources indicated in the uplink grant.

10. The method of claim 9, wherein the first uplink resources identify a first interlace of resource blocks (RBs), and the mapping from the first uplink resources identifies a RB index of a starting RB for a set of RBs contiguous in the frequency domain for the uplink transmission based at least in part on the first interlace of RBs.

11. The method of claim 10, wherein the mapping from the first uplink resources further identifies an interlace offset for the starting RB.

12. The method of claim 11, wherein the mapping from the first uplink resources further identifies a shift to be applied to the starting RB.

13. The method of claim 12, wherein one or more of the interlace offset or the shift are indicated in the uplink grant, are semi-statically configured at the UE via a system information block (SIB) or dedicated UE signaling, or are fixed according to a specified offset or look-up table.

14. The method of claim 9, wherein the first uplink resources identify a first interlace of resource blocks (RBs) and a second interlace of RBs, and the mapping from the first uplink resources identifies a RB index of a starting RB for a set of RBs contiguous in the frequency domain for the uplink transmission based at least in part on both the first interlace of RBs and the second interlace of RBs.

15. The method of claim 9, wherein the first uplink resources identify a first interlace of resource blocks (RBs) and a second interlace of RBs, and the mapping from the first uplink resources comprises:
identifying a first RB index of a first starting RB for a first subset of RBs contiguous in the frequency domain for the uplink transmission based at least in part on both the first interlace of RBs and the second interlace of RBs; and
identifying a second RB index of a second starting RB for a second subset of RBs contiguous in the frequency domain for the uplink transmission based at least in part on both the first interlace of RBs and the second interlace of RBs.

16. The method of claim 1, wherein the identifying the resource allocation scheme comprises:
receiving a trigger to transmit the uplink transmission;
determining whether to transmit the uplink transmission using a first frequency band of the two or more available shared radio frequency spectrum bands or a second frequency band of the two or more available shared radio frequency spectrum bands; and
identifying the resource allocation scheme for the uplink transmission based at least in part on the first frequency band or the second frequency band to be used for the uplink transmission.

17. The method of claim 16, wherein the trigger comprises an indication to transmit one or more of an uplink control channel transmission, a sounding reference signal transmission, or a random access transmission.

18. The method of claim 16, wherein the resource allocation scheme is pre-configured at the UE via a broadcast message provided by the base station or a specified resource allocation scheme.

19. The method of claim 1, wherein the identifying the resource allocation scheme comprises:
autonomously initiating the uplink transmission;
determining whether to transmit the uplink transmission using a first frequency band of the two or more available shared radio frequency spectrum bands or a second frequency band of the two or more available shared radio frequency spectrum bands; and
identifying the resource allocation scheme for the uplink transmission based at least in part on the first frequency band or the second frequency band to be used for the uplink transmission.

20. The method of claim 19, further comprising:
transmitting an uplink control channel with the uplink transmission that indicates the resource allocation scheme.

21. The method of claim 1, wherein the two or more available shared radio frequency spectrum bands have different energy emission limits.

22. An apparatus for wireless communication, comprising:
a transmitter;
a processor;
memory in electronic communication with the processor; and
instructions stored in the memory and operable, when executed by the processor, to cause the apparatus to:
select a frequency band of two or more available shared radio frequency spectrum bands for an uplink transmission from the apparatus to a base station;

identify a resource allocation scheme of a plurality of available resource allocation schemes for the uplink transmission based at least in part on the selected frequency band; and transmit, via the transmitter, the uplink transmission from the apparatus to the base station using the identified resource allocation scheme.

23. The apparatus of claim 22, further comprising a receiver, wherein the instructions to identify the resource allocation scheme are executable by the processor to cause the apparatus to:

receive, via the receiver, an uplink grant from the base station;

determine whether the uplink grant includes a resource allocation (RA) type for a first frequency band of the two or more available shared radio frequency spectrum bands or a second frequency band of the two or more available shared radio frequency spectrum bands; and identify the resource allocation scheme for the uplink transmission based at least in part on the determined RA type.

24. The apparatus of claim 23, wherein the instructions to identify the resource allocation scheme are executable by the processor to cause the apparatus to:

identify first uplink resources based on the first frequency band of the two or more available shared radio frequency spectrum bands in the uplink grant;

identify that the second frequency band of the two or more available shared radio frequency spectrum bands is to be used for the uplink transmission; and determine second uplink resources for the second frequency band based on a mapping from the first uplink resources.

25. The apparatus of claim 22, further comprising a receiver, wherein the instructions to identify the resource allocation scheme are executable by the processor to cause the apparatus to:

receive, via the receiver, an uplink grant from the base station;

determine whether the uplink grant includes a first resource allocation (RA) type for a first frequency band of the two or more available shared radio frequency spectrum bands or a second RA type associated with a dedicated radio frequency spectrum band; and identify the resource allocation scheme for the uplink transmission based at least in part on the determined RA type.

26. The apparatus of claim 25, wherein the instructions to determine whether the uplink grant includes the first RA type or the second RA type are executable by the processor to cause the apparatus to:

identify that a second frequency band of the two or more available shared radio frequency spectrum bands is to be used for the uplink transmission; and determine second uplink resources for the second frequency band based on a mapping from first uplink resources indicated in the uplink grant.

27. The apparatus of claim 22, further comprising a receiver, wherein the instructions to identify the resource allocation scheme are executable by the processor to cause the apparatus to:

receive, via the receiver, a trigger to transmit the uplink transmission;

determine whether to transmit the uplink transmission using a first frequency band of the two or more available shared radio frequency spectrum bands or a second frequency band of the two or more available shared radio frequency spectrum bands; and identify the resource allocation scheme for the uplink transmission based at least in part on the first frequency band or the second frequency band to be used for the uplink transmission.

28. The apparatus of claim 22, wherein the instructions to identify the resource allocation scheme are executable by the processor to cause the apparatus to:

autonomously initiate the uplink transmission;

determine whether to transmit the uplink transmission using a first frequency band of the two or more available shared radio frequency spectrum bands or a second frequency band of the two or more available shared radio frequency spectrum bands; and identify the resource allocation scheme for the uplink transmission based at least in part on the first frequency band or the second frequency band to be used for the uplink transmission.

29. An apparatus for wireless communication, comprising:

means for selecting a frequency band of two or more available shared radio frequency spectrum bands for an uplink transmission from the apparatus to a base station;

means for identifying a resource allocation scheme of a plurality of available resource allocation schemes for the uplink transmission based at least in part on the selected frequency band; and means for transmitting the uplink transmission from the apparatus to the base station using the identified resource allocation scheme.

30. A non-transitory computer readable medium storing code for wireless communication, the code comprising instructions executable by a processor to:

select a frequency band of two or more available shared radio frequency spectrum bands for an uplink transmission from a user equipment (UE) to a base station;

identify a resource allocation scheme of a plurality of available resource allocation schemes for the uplink transmission based at least in part on the selected frequency band; and transmit the uplink transmission from the UE to the base station using the identified resource allocation scheme.

* * * * *